(12) United States Patent
Shibasaki

(10) Patent No.: US 10,684,480 B2
(45) Date of Patent: Jun. 16, 2020

(54) INFORMATION DISPLAY SYSTEM

(71) Applicant: DENSO WAVE INCORPORATED, Chita-gun, Aichi-Pref. (JP)

(72) Inventor: Ryota Shibasaki, Chita-gun (JP)

(73) Assignee: DENSO WAVE INCORPORATED, Aichi-Pref. (JP)

( * ) Notice: Subject to any disclaimer, the term of this patent is extended or adjusted under 35 U.S.C. 154(b) by 7 days.

(21) Appl. No.: 15/922,561

(22) Filed: Mar. 15, 2018

(65) Prior Publication Data

US 2018/0267314 A1    Sep. 20, 2018

(30) Foreign Application Priority Data

Mar. 16, 2017 (JP) ................ 2017-051545
Jun. 22, 2017 (JP) ................ 2017-122222

(51) Int. Cl.
| | |
|---|---|
| *G02B 27/01* | (2006.01) |
| *G06F 3/0485* | (2013.01) |
| *G06F 3/01* | (2006.01) |
| *G06F 1/16* | (2006.01) |

(52) U.S. Cl.
CPC ......... *G02B 27/0172* (2013.01); *G06F 1/163* (2013.01); *G06F 3/011* (2013.01); *G06F 3/0485* (2013.01); *G02B 2027/0138* (2013.01); *G02B 2027/0141* (2013.01); *G02B 2027/0178* (2013.01)

(58) Field of Classification Search
CPC ............ G02B 27/0172; G02B 27/0178; G06F 3/0485; G06F 3/011; G06F 1/163; B25J 9/1697; B25J 13/00; B25J 13/006; B25J 13/089

See application file for complete search history.

(56) References Cited

U.S. PATENT DOCUMENTS

| | | | | |
|---|---|---|---|---|
| 9,643,314 B2 * | 5/2017 | Guerin | .................. | B25J 9/1605 |
| 9,713,871 B2 * | 7/2017 | Hill | .......................... | G06T 7/73 |
| 9,851,803 B2 * | 12/2017 | Fisher | .................. | G02B 27/017 |
| 9,875,075 B1 * | 1/2018 | VanBlon | ................ | G06F 3/1454 |
| 2004/0041822 A1 * | 3/2004 | Iizuka | .................. | G06T 15/005 |
| | | | | 345/634 |
| 2004/0189631 A1 * | 9/2004 | Kazi | ..................... | B25J 9/1671 |
| | | | | 345/418 |
| 2012/0119978 A1 * | 5/2012 | Border | ............... | G02B 27/0172 |
| | | | | 345/8 |

(Continued)

*Primary Examiner* — Sardis F Azongha
(74) *Attorney, Agent, or Firm* — Oliff PLC

(57) ABSTRACT

An information display system includes a wearable display, a monitoring target information acquiring unit, a display area setting unit, and a display control unit. The wearable display is worn by a user and displays information within a field of view of the user. The monitoring target information acquiring unit acquires monitoring target information that is information related to a monitoring target. The display area setting unit sets a display area for displaying the monitoring target information within the field of view of the user. The display control unit displays the monitoring target information within the display area without scrolling when an amount of information of the monitoring target information fits within the display area, and displays the monitoring target within the display area with scrolling when the amount of information of the monitoring target information does not fit within the display area.

17 Claims, 25 Drawing Sheets

(56) References Cited

U.S. PATENT DOCUMENTS

| | | | |
|---|---|---|---|
| 2013/0151010 A1* | 6/2013 | Kubota | B25J 13/06 700/264 |
| 2015/0143283 A1* | 5/2015 | Noda | G06F 3/017 715/784 |
| 2015/0206321 A1* | 7/2015 | Scavezze | G06T 7/20 345/633 |
| 2015/0346816 A1 | 12/2015 | Lee | |
| 2016/0034042 A1* | 2/2016 | Joo | G02B 27/0172 345/633 |
| 2016/0158937 A1* | 6/2016 | Kamoi | B25J 9/1697 700/259 |
| 2016/0207198 A1* | 7/2016 | Willfor | G05B 19/4061 |
| 2016/0288318 A1* | 10/2016 | Nakazato | B25J 9/1666 |
| 2017/0165841 A1* | 6/2017 | Kamoi | B25J 9/1697 |
| 2019/0118386 A1* | 4/2019 | Okumura | B25J 9/1689 |

\* cited by examiner

FIG.24
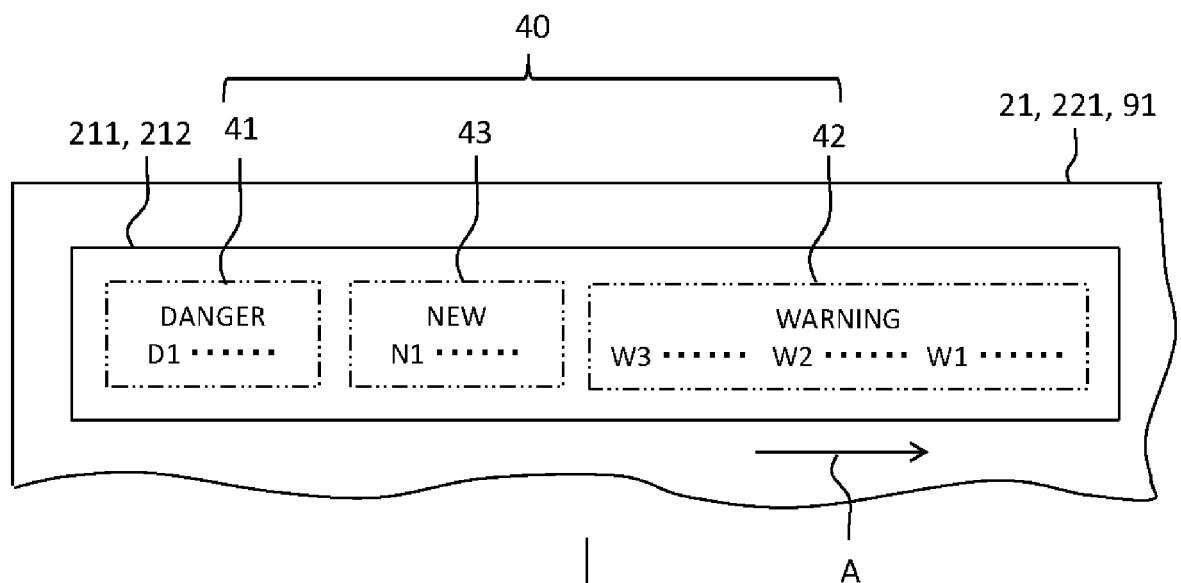
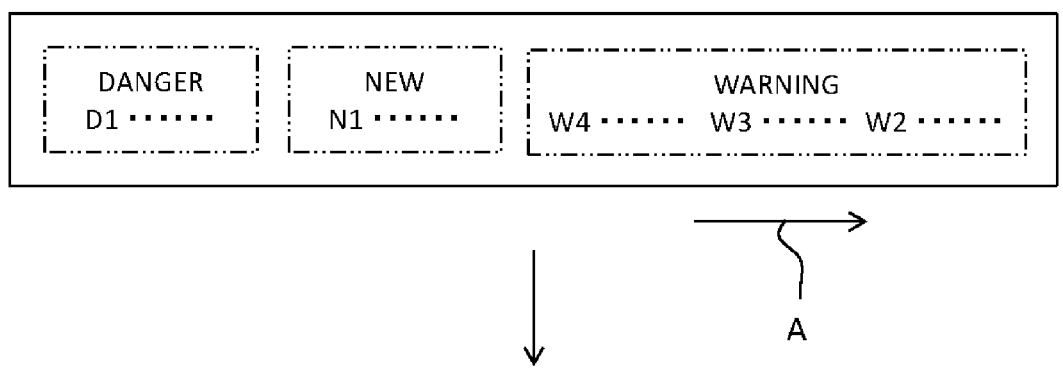
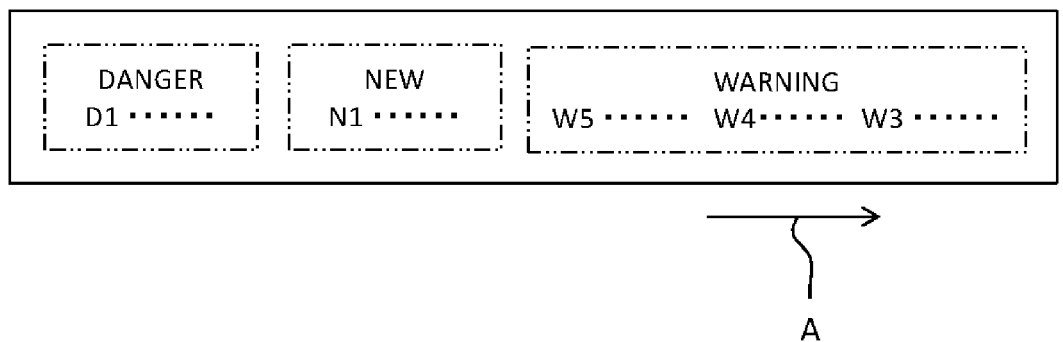

FIG.25
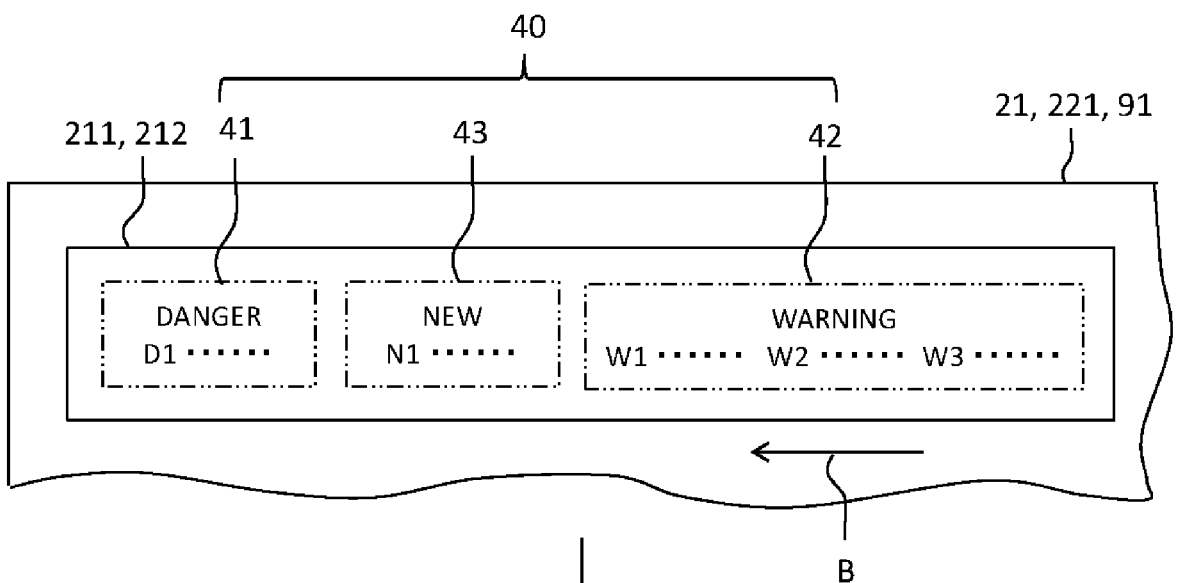
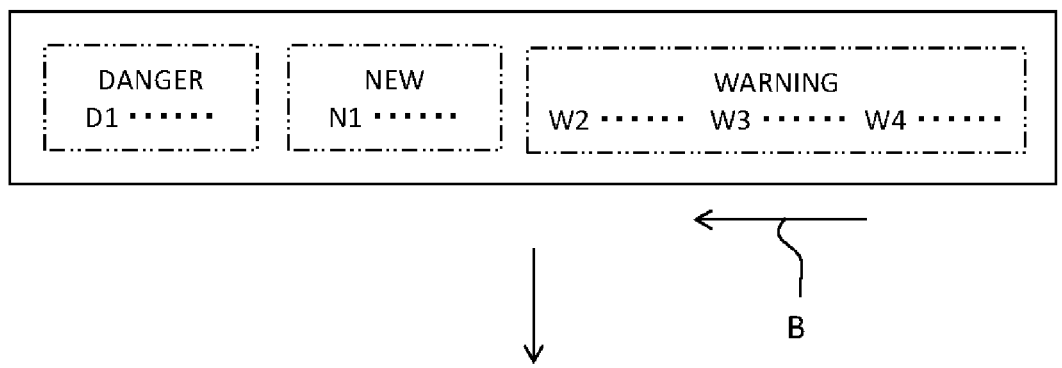
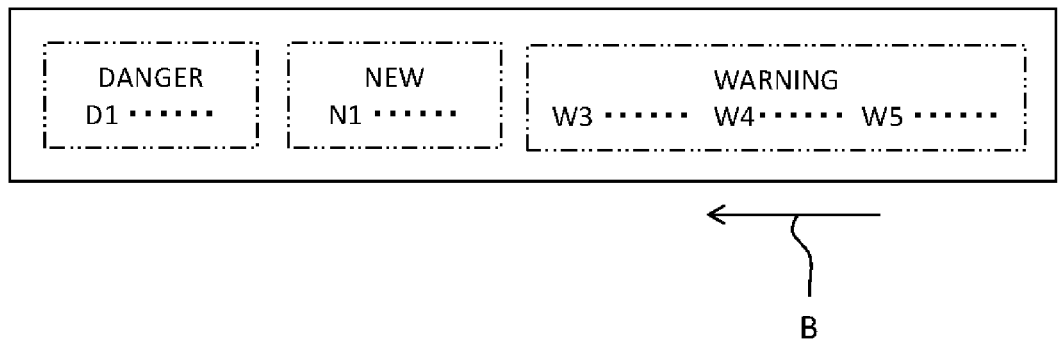

INFORMATION DISPLAY SYSTEM

CROSS-REFERENCE TO RELATED APPLICATION

This application is based on and claims the benefit of priority from earlier Japanese Patent Application Nos. 2017-051545, filed Mar. 16, 2017, and 2017-122222, filed Jun. 22, 2017, the descriptions of which are incorporated herein by reference.

BACKGROUND

Technical Field

The present disclosure relates to an information display system that displays, within a field of view of a user, information related to a monitoring target through a type of display that is worn on a head portion of the user.

Related Art

In recent years, a technology has been proposed in which, for example, virtual-reality images and various types of information are displayed through use of a so-called head-mounted display (referred to, hereafter, as an HMD) that can be worn on a head of a user (see, for example, JP-A-2015-228201). As application of this technology, the following can be supposed. For example, to present information related to safety regarding a robot or the like to a user who is working within or near an operating area of the robot or the like, the information related to safety is displayed in an HMD that is worn by the user. As a result, the user is able to acquire the information related to safety regarding the robot or the like while keeping their gaze raised, without having to peer into a teaching pendant, a tablet terminal, or the like. Consequently, improvement in safety is achieved.

However, most typical HMDs are configured such that a transparent-type display unit is arranged in a location that overlaps the field of view of the user and various types of information are displayed in the display unit. In this case, the information displayed in the display unit and an actual view seen by the user through the display unit overlap. Therefore, for example, in cases in which a large amount of information is to be displayed in the display unit, more information is displayed through enlargement of an area in which the information is displayed. However, the field of view of the user is obstructed by the various pieces of information displayed in the display unit. Meanwhile, obstruction of the field of view can be suppressed through reduction of the area in which the information is displayed. However, in this case, characters may become small and illegible, or required information may not be appropriately displayed. In this way, decrease in safety instead becomes a concern depending on a display aspect of the information.

SUMMARY

It is thus desired to provide an information display system that presents a user with information using a wearable display and enables safe information presentation.

An exemplary embodiment of the present disclosure provides an information display system that includes: a wearable display that is worn by a user and displays information within a field of view of the user; a monitoring target information acquiring unit that acquires monitoring target information that is information related to a monitoring target; a display area setting unit that sets a display area for displaying the monitoring target information within the field of view of the user; and a display control unit that displays the monitoring target information within the display area without scrolling when an amount of information of the monitoring target information fits within the display area, and displays the monitoring target within the display area with scrolling when the amount of information of the monitoring target information does not fit within the display area.

As a result, even when the amount of information of the monitoring target information to be displayed within the field of view is large, it is not necessary to enlarge the display area within the field of view and simultaneously display all pieces of monitoring target information. Therefore, even when the amount of information of the monitoring target information is large, a situation in which the field of view becomes filled with the monitoring target information and obstructed can be suppressed. That is, as a result of the monitoring target information of which the amount of information is large being displayed with scrolling, all pieces of monitoring target information can be efficiently displayed while making the display area as small as possible. Consequently, a safe information presentation in which the field of view of the user is not easily obstructed can be achieved.

In the present disclosure, the display area setting unit may set the display area in correspondence to the amount of information of the monitoring target information such that the monitoring target is displayed without scrolling when the amount of information of the monitoring target information fits within a maximum area that is set in advance. The display area setting unit may set the display area to the maximum area when the amount of information of the monitoring target information does not fit within the maximum area.

As a result, when the amount of information of the monitoring target information is small, the display area can be made small in correspondence to the monitoring target information. Therefore, the field of view of the user is even less easily obstructed. Moreover, as a result, the display area does not become larger than the maximum display area. Therefore, the user can be provided with a feeling of security that the field of view will not be obstructed any further than the maximum area. Consequently, a safer information presentation in which the field of view of the user is even less easily obstructed can be achieved.

In the present disclosure, the monitoring target information may be classified into at least either of first rank information of which a degree of danger is high and second rank information of which the degree of danger is lower than that of the first rank information, based on a magnitude of danger. The display control unit may display the first rank information at all times, and display the second rank information with scrolling when the amount of information of the second rank information does not fit within the display area.

As a result, the first rank information of which the degree of danger is high is displayed within the field of view at all times. Therefore, the user can be aware of the first rank information of which the degree of danger is high at all times. In addition, the second rank information of which the degree of danger is low is displayed with scrolling. Therefore, even when the amount of information of the monitoring target information is large, the display area can be made small. As a result, the overall display area can be reduced while further facilitating confirmation of information of which the degree of danger is high. Consequently, a safer information presentation in which the field of view of the user is further less easily obstructed can be achieved.

In the present disclosure, the display control unit may repeatedly perform display of the second rank information by scrolling at a fixed cycle, and make the cycle of scrolling faster as the amount of information of the second rank information increases.

As a result, even when the amount of information of the second rank information increases, the period of a single scrolling cycle can be shortened to the greatest possible extent. Therefore, when the user wishes to view a specific piece of information among the second rank information that is being scrolled, the user can view the targeted piece of information as quickly as possible.

In addition, the user can estimate the magnitude of the amount of information of the second rank information based on a scrolling speed of the second rank information that is repeatedly scrolled at a fixed cycle, that is, the length of time until the same piece of information is displayed again. Therefore, the user can intuitively visually confirm the amount of information of the second rank information and thus experiences convenience.

In the present disclosure, the display control unit may display at least a newest piece of monitoring target information, among the monitoring target information newly acquired by the monitoring target information acquiring unit, without scrolling for a predetermined period As a result, regarding the newest piece of monitoring target information that has been newly added, a period during which the user can be aware of the newest piece of monitoring target information can be secured. Therefore, the user can be aware of the newest piece of information that has been newly added with further certainty. Consequently, a safer information presentation can be achieved.

Here, in the above-described configuration, the number of pieces of monitoring target information that can be simultaneously displayed within the display area is limited. As a result, when the monitoring target information acquiring unit continuously acquires a plurality of pieces of new information over a short period, not all pieces of the monitoring target information that has been newly acquired may be displayed within the display area.

Therefore, in the present disclosure, the display control unit may display a next piece of monitoring target information without scrolling as a newest piece of monitoring target information when the next piece of monitoring target information is acquired while a previous piece of monitoring target information acquired by the monitoring target information acquiring unit is being displayed without scrolling. The display control unit may display the previous piece of monitoring target information by inserting the previous piece of monitoring target information into other pieces of monitoring target information that are already being displayed with scrolling.

As a result, even when the monitoring target information acquiring unit continuously acquires a plurality of pieces of new monitoring target information over a short period, at least the newest piece of monitoring target information can be displayed within the display area without scrolling. Therefore, the user can differentiate at least the newest piece of monitoring target information from other pieces of monitoring target information and be aware of newest piece of monitoring target information. In addition, the previous piece of monitoring target information that has been acquired before the acquisition of the newest piece of monitoring target information is also displayed by being inserted into the scrolling display of the other pieces of monitoring target information. Therefore, the user is able to confirm the previous piece of monitoring target information, that is, the piece of monitoring target information that had just previously been the newest piece of monitoring target information by viewing the display that is scrolling. In this manner, according to the present configuration, even when a plurality of pieces of new monitoring target information are continuously generated during a short period, the user is able to confirm these pieces of new monitoring target information. Consequently, a safer information presentation can be achieved.

In the present disclosure, the display control unit may display the previous piece of monitoring target information in a manner differing from a display aspect of the other pieces of monitoring target information when the previous piece of monitoring target information is displayed by being inserted into the other pieces of monitoring target information that are already being displayed with scrolling.

As a result, the user can more easily differentiate between the previous piece of monitoring target information that has been inserted into the scrolling display of the other pieces of monitoring target information and the other pieces of monitoring target information that are already being displayed by scrolling display, at a glance. As a result, the user can easily ascertain the newly inserted piece of monitoring target information among the pieces of monitoring target information that are being displayed with scrolling. Consequently, a safer information presentation can be achieved.

In the present disclosure, the display control unit may display the other pieces of monitoring target information with scrolling in a direction away from a display position of the newest piece of monitoring target information, and display the previous piece of monitoring target information, together with the other pieces of monitoring target information, with scrolling by inserting the previous piece of monitoring target information at the end of the other pieces of monitoring target information that are being displayed within the display area.

As a result, when the previous piece of monitoring target information is displayed by being inserted into the other pieces of monitoring target information that are already being displayed with scrolling, display of the previous piece of monitoring target information can be smoothly switched from display without scrolling to display with scrolling, with an appearance of continuity. Therefore, the user can more easily recognize that the previous piece of monitoring target information that has been inserted into the other pieces of monitoring target information that are being scrolled had just previously been the newest piece of monitoring information that had been displayed without scrolling. As a result, the user can more easily be aware of the previous piece of monitoring target information that is being displayed with scrolling, that is, the previous piece of monitoring target information that would be displayed without scrolling if not for the insertion. Consequently, a safer information presentation can be achieved.

In this regard, in the present disclosure, the display control unit may display the other pieces of monitoring target information with scrolling in a direction approaching a display position of the newest piece of monitoring target information, and display the previous piece of monitoring target information, together with the other pieces of monitoring target information, with scrolling by inserting the previous piece of monitoring target information at the end of the other pieces of monitoring target information that are being displayed within the display area.

As a result, when the previous piece of monitoring target information is displayed by being inserted into the other pieces of monitoring target information that are already being displayed with scrolling, display of the previous piece of monitoring target information can be switched from display without scrolling to display with scrolling, with an appearance of discontinuity. Therefore, the user can more easily recognize that the newest piece of monitoring target information that is displayed without scrolling has switched from the previous piece of monitoring target information to the current newest piece of monitoring target information. As a result, the user can even more easily be aware of the newest piece of monitoring target information. Consequently, a safer information presentation can be achieved.

In the present disclosure, the display control unit may display the inside of the display area so as to be non-transparent. As a result, the monitoring target information displayed within the display area can be prevented from blending with an actual scene in the background of the display area. Consequently, the monitoring target information can be made more easily visible.

BRIEF DESCRIPTION OF THE DRAWINGS

In the accompanying drawings:

FIG. 24 is a diagram (3) of an example of a portion of a field of view visible to a user through a display unit, according to another embodiment; and FIG. 25 is a diagram (4) of the example of a portion of the field of view visible to the user through the display unit, according to the other embodiment.

DESCRIPTION OF THE EMBODIMENTS

A plurality of embodiments of the present disclosure will hereinafter be described. Configurations according to the embodiments that are essentially identical to each other are given the same reference numbers. Descriptions thereof are omitted.

First Embodiment

A first embodiment will be described below, with reference to FIGS. 1 to 18.

Figure 1:
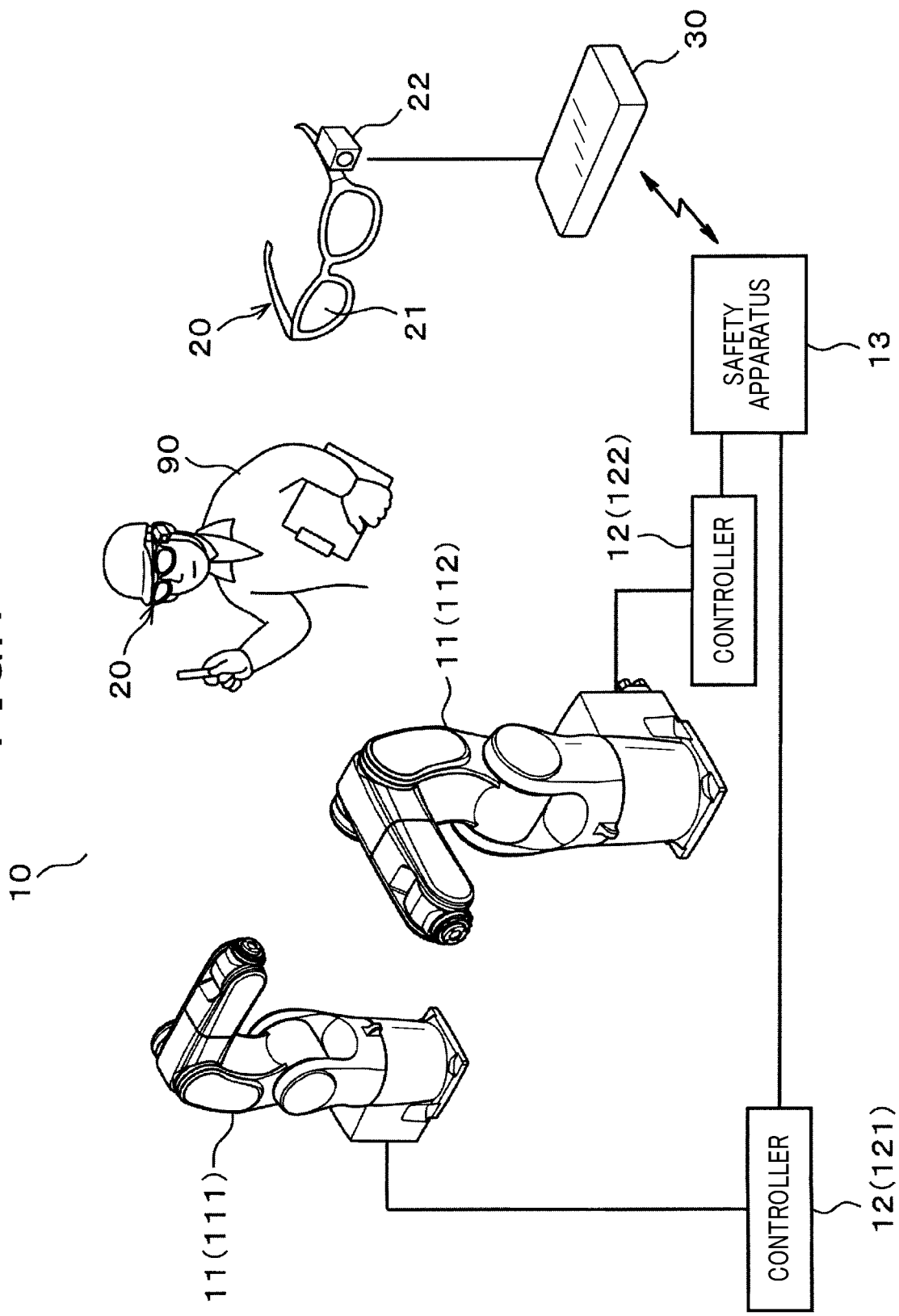
FIG. 1 is a diagram schematically showing an overall configuration of an information display system according to a first embodiment.
Figure 2:
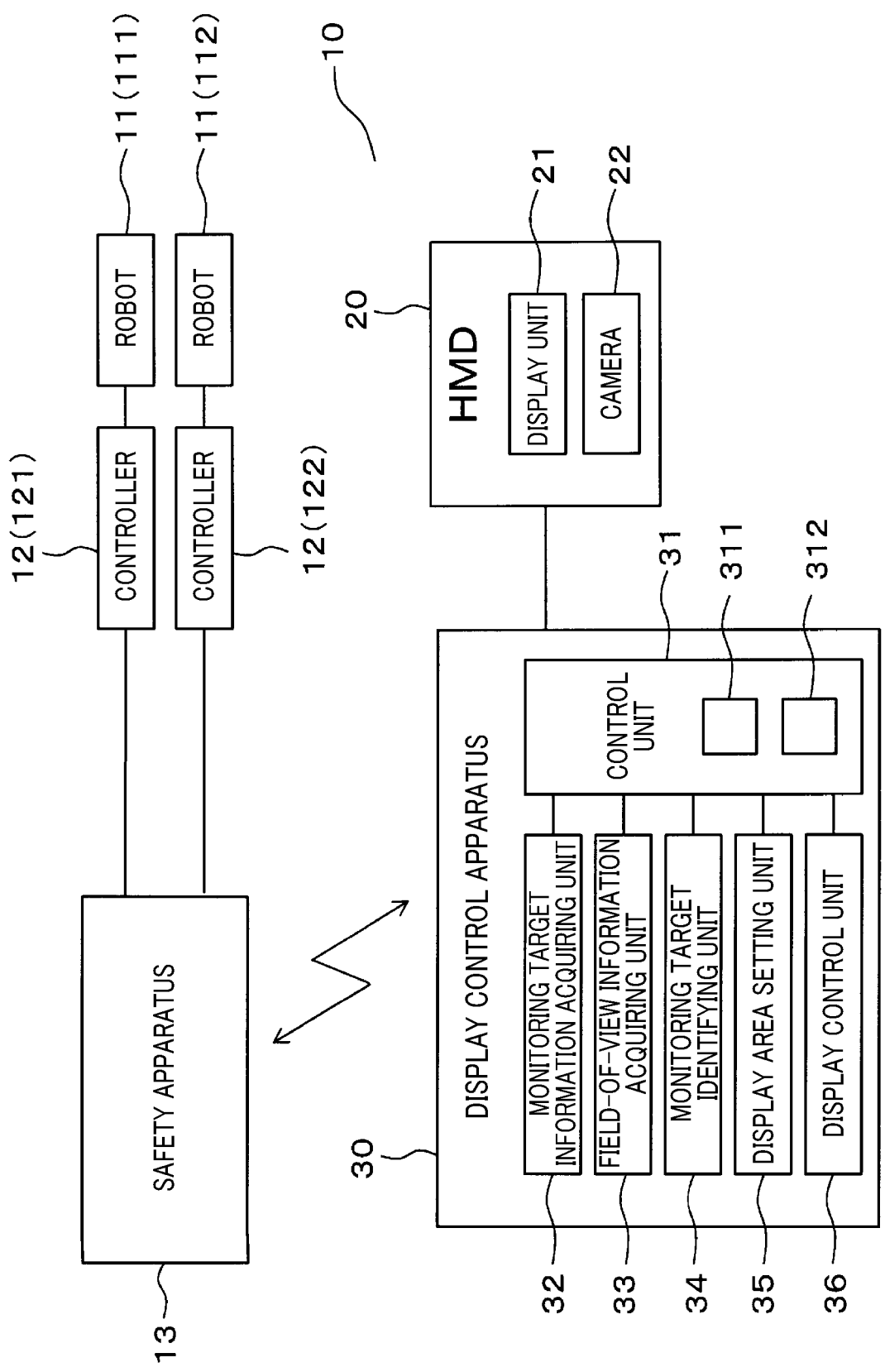
FIG. 2 is a block diagram schematically showing an electrical configuration of the information display system according to the first embodiment.

As shown in FIGS. 1 and 2, an information display system 10 is configured to include at least a single robot 11 (two robots 11 according to the present embodiment), a robot controller 12, a safety apparatus 13, a so-called head-mounted display 20 (referred to, hereafter, as an HMD 20), and a display control apparatus 30. The robot 11 is a monitoring target. The robot controller 12 is provided respectively for each robot 11.

In the description below, the two robots 11 are referred to as a first robot 111 and a second robot 112 when differentiation therebetween is made. In addition, the robot controllers 12 corresponding to the first robot 111 and the second robot 112 are respectively referred to as a first robot controller 121 and a second robot controller 122.

For example, the robot 11 is configured by a six-axis vertical articulated robot. The robot 11 has a typical configuration. Therefore, a detailed description thereof will be omitted. The robot 11 has a six-axis arm that is driven by servomotors. A hand or the like is provided at a tip end portion of the sixth-axis arm. For example, the hand is used to grip a workpiece that is housed in a pallet. The robot 11 is connected to the robot controller 12 by a connection cable (not shown). The servomotor of each axis is controlled by the robot controller 12.

The robot controller 12 includes a control circuit, a servo control unit, a power supply unit, and the like (not shown). The control circuit is mainly configured by a microcomputer. The robot controller 12 controls the servomotor of each axis of the robot 11 via the servo control unit, based on operation programs stored in advance, teaching data set through a teaching pendant or the like (not shown), various parameters, and the like. As a result, the robot controller 12 makes each robot 11 automatically perform operations such as assembly of workpieces.

Each robot controller 12 is communicably connected to the safety apparatus 13. The safety apparatus 13 is configured to acquire, from the robot controller 12 side, various types of information that enable identification of an operation state of each robot 11 and a control state of each robot controller 12. Therefore, the safety apparatus 13 acquires, in real-time, operation information indicating the operation state of the robot 11 and control information indicating the control state of the robot controller 12. For example, the safety apparatus 13 acquires operation information such as a rotation angle of the arm of the robot 11 and an energization state of the motors.

In addition, the safety apparatus 13 generates three-dimensional (3D) model image data based on the information on the robot 11 acquired from the robot controller 12. The 3D model image data expresses a current form, that is, attitude of the robot 11 modeled in 3D. Furthermore, the safety apparatus 13 also stores coordinates of each robot 11 on a two-dimensional coordinate system of which a point of origin is an area in which the robot 11 is set, such as a reference position within a factory. That is, the safety apparatus 12 stores a setup position of the robot 11.

The HMD 20 is configured to be shaped so as to be wearable on a head portion of a user. The HMD 20 displays various types of information within a field of view of the user. The HMD 20 may be either of a binocular type in which both eyes are covered and a monocular type in which only either eye is covered. However, according to the present embodiment, the HMD 20 is more suitable as the binocular type that tends to take over the field of view of the user. In addition, as the shape of the HMD 20, a glasses type that is worn in a manner similar to eyeglasses, a hat type that is worn in a manner similar to a hat, and the like are supposed. However, the HMD 20 may be of any shape. The HMD 20 according to the present embodiment is assumed to be the glasses type.

As also shown in FIG. 2, the HMD 20 has a display unit 21 and a camera 22. The display unit 21 is provided in a position that overlaps the field of view of the user in a state in which the user is wearing the HMD 20. According to the present embodiment, the display unit 21 is a portion that corresponds to a lens portion of the eyeglasses. The display unit 21 is configured by a so-called transparent-type display that displays information such as images. Therefore, an image that is displayed in the HMD 20 is displayed so as to overlap the field of view of the user. In other words, the user sees both an actual scene as seen through the eyes of the user themselves and a virtual image displayed in the HMD 20.

The camera 22 is configured by a compact charge-coupled device (CCD) camera or complementary metal-oxide-semiconductor (CMOS) camera. The camera 22 is integrally attached to the HMD 20. The camera 22 is provided in one side portion of a frame of the HMD 20 so as to coincide with the orientation of the face of the user. As shown in FIG. 1, the camera 22 captures an image in a direction in which the front of the head portion of a user 90 is facing, in a state in which the user 90 is wearing the HMD 20 on their head. Therefore, the image captured by the camera 22 has substantially the same angle of view as the field of view of the user 90. In other words, the camera 22 captures substantially the same scene as that seen by the user 90.

The display unit 21 is not limited to the transparent-type display and may be configured by a non-transparent type display. In this case, as a result of the image captured by the camera 22 being displayed in real-time in the display unit 21, the HMD 20 may virtually present the user with the scene captured by the camera 22. That is, the HMD 20 may reproduce the field of view of the user in the display unit 21. In addition, the HMD 20 is not limited to that which includes the display unit 21. The HMD 20 may be a retinal-projection type that directly projects a virtual image onto the retina of the user.

The HMD 20 is connected to the display control apparatus 30 by wireless or wired connection. The display control apparatus 30 may be integrally configured with the HMD 20. As shown in FIG. 2, a control unit 31 is provided within the display control apparatus 30. The control unit 31 is configured by a microcomputer or the like. The display control apparatus 30 transmits image data to be displayed in the display unit 21 of the HMD 20 and receives image data picked up by the camera 22. In addition, the display control apparatus 30 communicates with the safety apparatus 13 by wired or wireless communication.

As shown in FIG. 2, the display control apparatus 30 includes, in addition to the control unit 31, a monitoring target information acquiring unit 32, a field-of-view information acquiring unit 33, a monitoring target identifying unit 34, a display area setting unit 35, and a display control unit 36. The control unit 31 is mainly configured by a microcomputer that includes, for example, a central processing unit (CPU) 311 and a storage area 312 such as a read-only memory (ROM), a random access memory (RAM), and a rewritable flash memory. The control unit 31 performs control of the overall HMD 20.

The storage area 312 stores therein an information display program. The control unit 31 actualizes, through software, the monitoring target information acquiring unit 32, the field-of-view information acquiring unit 33, the monitoring target identifying unit 34, the display area setting unit 35, the display control unit 36, and the like as a result of the CPU 311 running the information display program. The monitoring target information acquiring unit 32, the field-of-view information acquiring unit 33, the monitoring target identifying unit 34, the display area setting unit 35, and the display control unit 36 may be actualized by hardware, such as an integrated circuit that is integrated with the control unit 31.

The monitoring target information acquiring unit 32 acquires monitoring target information from the safety apparatus 13 in real-time, as information related to the robot 11 that is the monitoring target. The monitoring target information is composed of pieces of information that continually change based on the operation of the robot 11. For example, the monitoring target information includes the operation information indicating the operation state of the robot 11, including the above-described 3D model image data, and the control information indicating the control state of the robot controller 12. In addition, for example, the monitoring target information also includes alert and warning information for presenting the user with alerts and warnings related to the robot 11.

Figure 3:
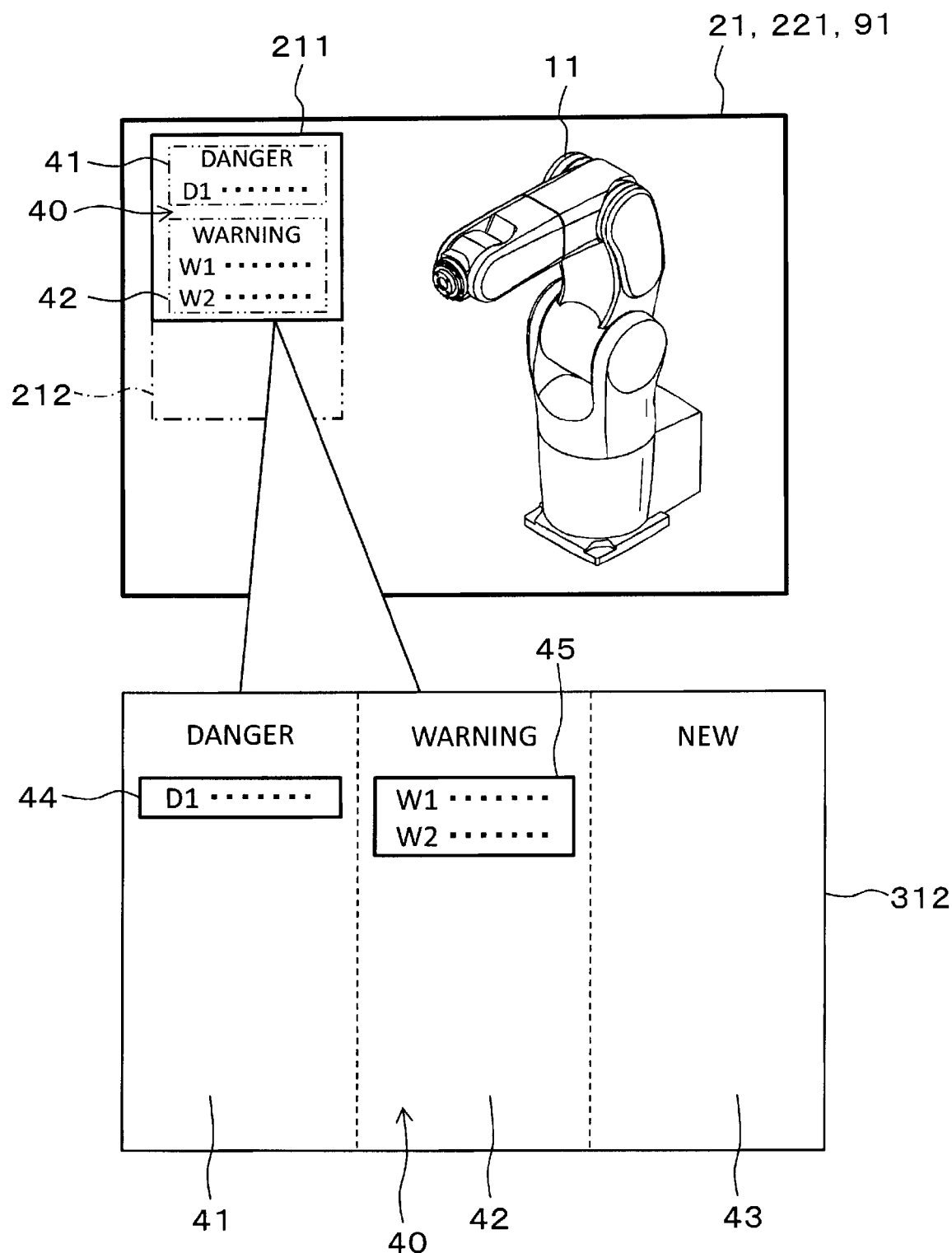
FIG. 3 is a diagram of an example of a field of view visible to a user through a display unit and monitoring target information stored in a storage area, in which the monitoring target information is displayed by non-scrolling display, according to the first embodiment.

FIGS. 3 to 10 conceptually show examples of monitoring target information 40 acquired by the monitoring target information acquiring unit 32 and stored in the storage area 312. According to the present embodiment, for example, as shown in FIG. 3 and the like, the monitoring target information 40 is classified into at least two ranks, that is, first rank information 41 and second rank information 42 based on the degree of danger to the user, that is, the magnitude of danger. The first rank information 41 indicates information of which the degree of danger to the user is high. The second rank information 42 indicates information of which the degree of danger to the user is lower than that of the first rank information 41.

In addition, the monitoring target information acquiring unit 32 classifies information newly acquired from the safety apparatus 13 as new information 43 during a predetermined period from acquisition, regardless of whether the information is classified as the first rank information 41 or the second rank information 42. According to the present embodiment, the characters "DANGER" are used to indicate the first rank information 41. The characters "WARNING" are used to indicate the second rank information 42. In addition, the characters "NEW" are used to indicate the new information 43. The characters "DANGER," "WARNING" and "NEW" are identifiers that are used to identify the type of each piece of information.

Figure 4:
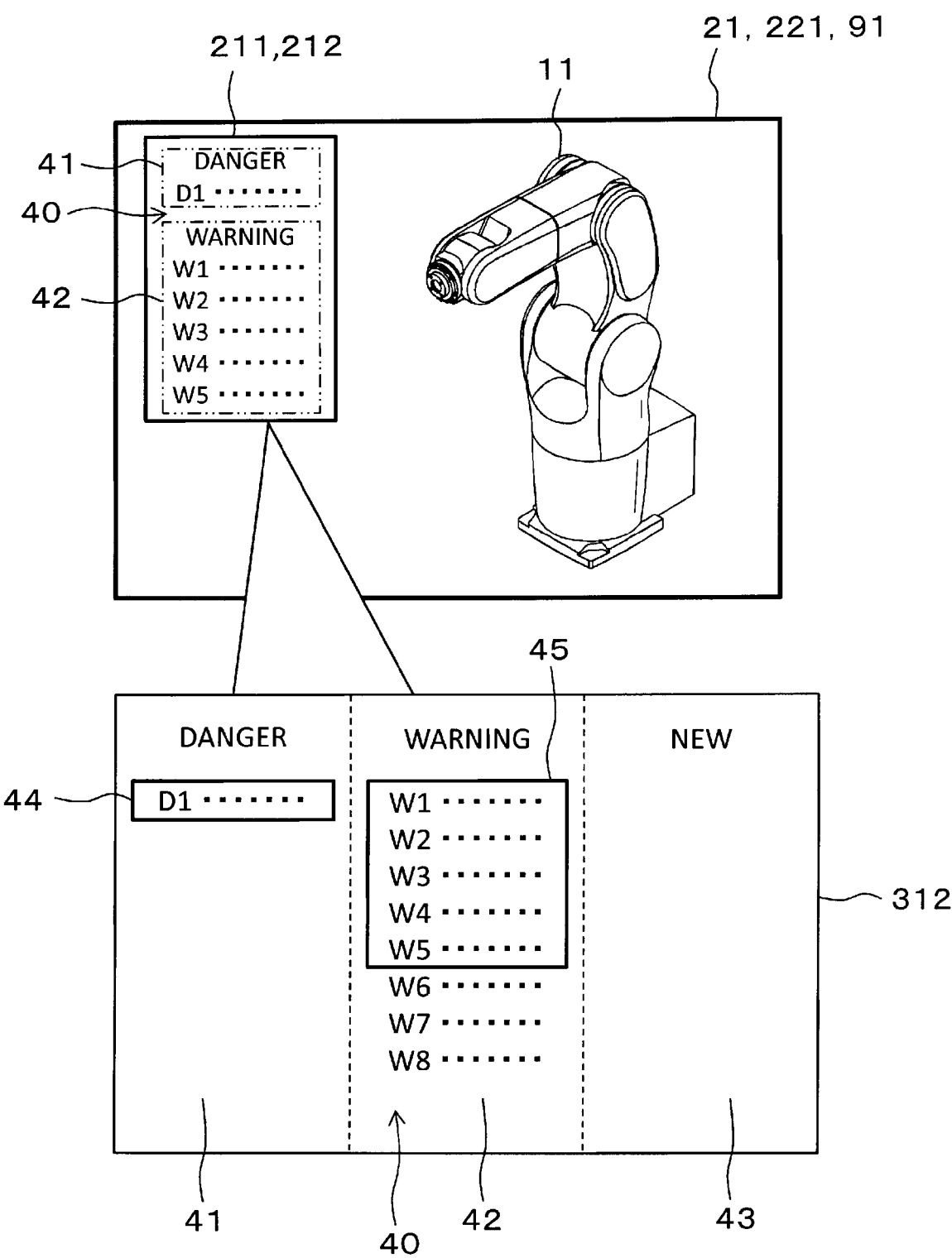
FIG. 4 is a diagram (1) of an example of the field of view visible to the user through the display unit and the monitoring target information in the storage area, in which the monitoring target information is displayed by scrolling display, according to the first embodiment.
Figure 10:
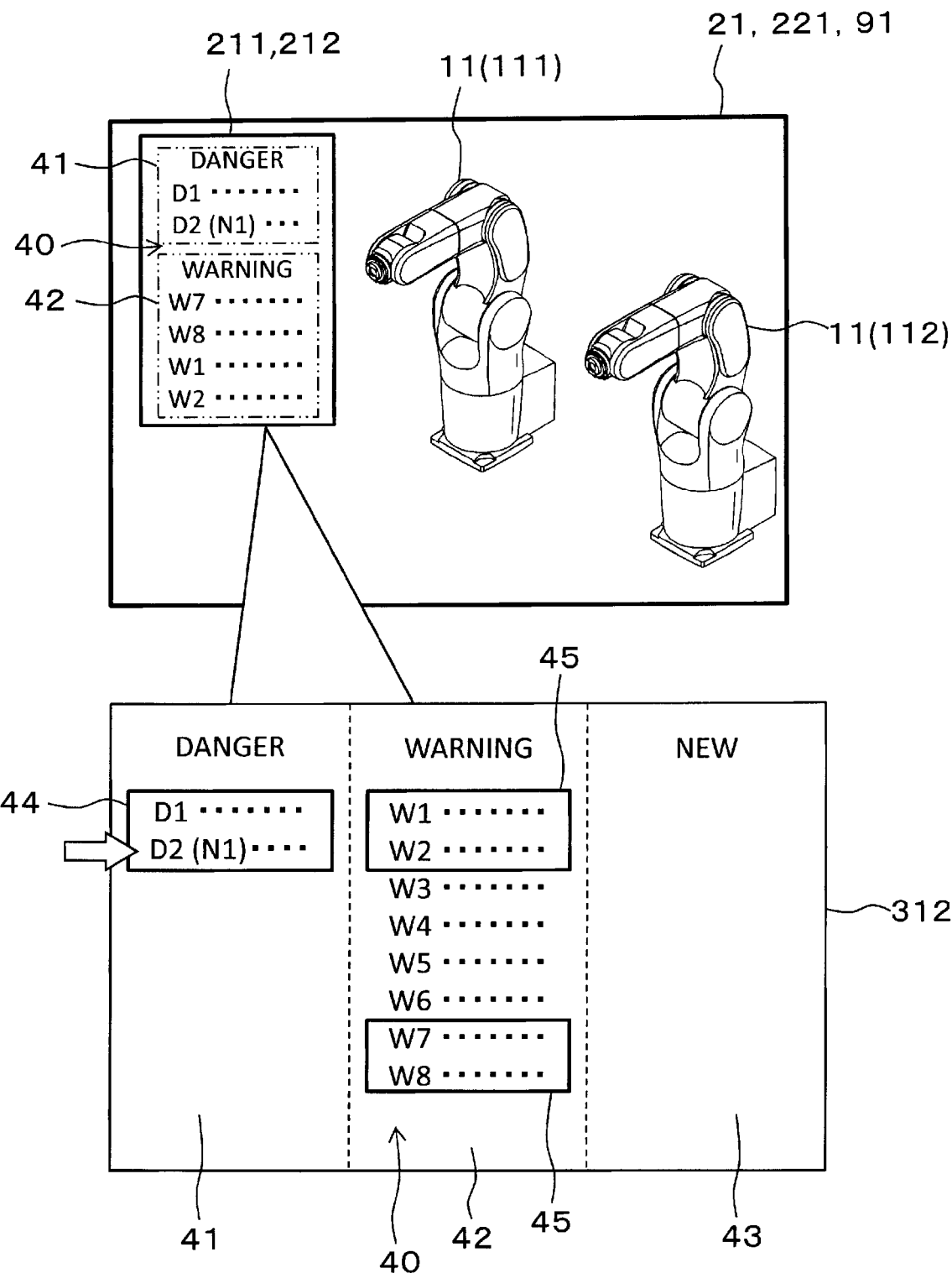
FIG. 10 is a diagram of an example of the field of view visible to the user through the display unit and the monitoring target information stored in the storage area, in which new information is incorporated into first rank information, according to the first embodiment.

The first rank information 41, the second rank information 42, and the new information 43 are composed of individual pieces of information. The monitoring target information acquiring unit 32 stores the individual pieces of information of the first rank information 41, the second rank information 42, and the new information 43 in the storage area 312 in the order of acquisition. For example, according to the present embodiment, as shown in FIG. 3, FIG. 10, and the like, reference symbols D1, D2, . . . are attached to the individual pieces of information of the first rank information 41. In this case, the reference symbols indicate that the piece of information to which D1 is attached has been acquired before the piece of information to which D2 is attached. In addition, as shown in FIG. 3, FIG. 4, and the like, reference symbols W1, W2, . . . are attached to the individual pieces of the second rank information 42. In this case, the reference symbols indicate that the piece of information to which W1 is attached has been acquired before the piece of information to which W2 is attached.

According to the present embodiment, the individual pieces of information stored in the storage area 312 are information to be displayed in the display area 211 of the HMD 20. For example, in the example in FIG. 3, the individual piece of information of the first rank information 41 to which D1 is attached and the individual pieces of information of the second rank information 42 to which W1 and W2 are attached are stored in the storage area 312 as information to be displayed in the HMD 20. However, the individual pieces of information of the new information 43 are not stored.

The field-of-view information acquiring unit 33 shown in FIG. 2 performs a process to acquire field-of-view information to identify the field of view of the user 90 who is wearing the HMD 20. The field of view of the user 90 refers to a scene as seen through the eyes of the user 90 in a state in which the user 90 is wearing the HMD 20. According to the present embodiment, the field of view of the user 90 refers to the scene as seen through the eyes of the user 90 through the display unit 21 that is the lens portion of the glasses. For example, the field-of-view information acquiring unit 33 acquires the field-of-view information of the user 90 from the image captured by the camera 22. According to the present embodiment, for example, as shown in FIG. 3 and the like, an imaging area 221 of the camera 22 and the area of the display unit 21 are considered to be a field of view 91 of the user 90.

The monitoring target identifying unit 34 shown in FIG. 2 performs a process to identify the robot 11 that is the monitoring target present within the field of view 91 of the user 90 based on the field-of-view information acquired by the field-of-view information acquiring unit 33. That is, the monitoring target identifying unit 34 identifies which of the robot 111 and robot 112 is the monitoring target, that is, the robot 11 present within the field of view 91 of the user 90. For example, the monitoring target identifying unit 34 identifies the robot 11 in the following manner. That is, for example, a marker for identifying the individual robot is attached to each robot 11. The monitoring target identifying unit 34 identifies each robot 11 by recognizing the marker attached to the robot 11 based on the image captured by the camera 22.

In addition, as another method, for example, the monitoring target identifying unit 34 identifies the robot 11 in the following manner. That is, the monitoring target identifying unit 34 acquires the current 3D model image data of each robot 11 from the safety apparatus 13. The monitoring target identifying unit 34 identifies each robot 11 by collating the 3D model image data of the robot 11 with the form of the robot 11 captured by the camera 22. In this case, the monitoring target information acquiring unit 32 may selectively acquire the monitoring target information 40 for the robot 11 that has entered the field of view 91 of the user 90 through the processes performed by the field-of-view information acquiring unit 33 and the monitoring target identifying unit 34.

For example, as shown in FIG. 3 and the like, the display area setting unit 35 performs a process to set the display area 211 for displaying the monitoring target information 40 within the field of view 91 of the user. The display area setting unit 35 sets the display area 211 to a size that is appropriate for an amount of information of the monitoring target information 40 acquired from the monitoring target information acquiring unit 32, that is, a current amount of information of the monitoring target information 40 stored in the storage area 312, based on the magnitude of the amount of information.

In other words, first, as shown in FIG. 3, the display area setting unit 35 virtually sets a maximum area 212 in advance, as a maximum range to which the display area 211 can be enlarged, that is, the maximum size of the display area 211. The maximum area 212 may be arbitrarily set by the user. Alternatively, the maximum area 212 may be in advance by the manufacturer or the like. In addition, the position of the maximum area 212 within the field of view 91 may be fixed. Alternatively, a configuration in which the position of the maximum area 212 within the field of view 91 is changed based on the position of the monitoring target 11 within the field of view 91 is also possible.

Next, the display area setting unit 35 sets the size of the display area 211 based on the amount of information of the monitoring target information 40 acquired from the monitoring target information acquiring unit 32, that is, the current amount of information of the monitoring target information 40 stored in the storage area 312. In this case, when the current amount of information of the monitoring target information 40 fits within the maximum area 212 as shown in FIG. 3, the display area setting unit 35 sets the display area 211 to a size that enables all pieces of monitoring target information 40 to be displayed within the display area 211, in correspondence to the current amount of information of the monitoring target information 40. Therefore, in this case, the size of the display area 211 is equal to or smaller than the size of the maximum area 212. In cases in which the current amount of information of the monitoring target information 40 does not fit within the maximum area 212 as shown in FIG. 4 and the like, the display area setting unit 35 sets the size of the display area 211 to the maximum area 212.

According to the present embodiment, whether or not the amount of information of the monitoring target information 40 fits within the maximum area 212 means whether or not the monitoring target information 40 fits within the maximum area 212, that is, no portion of the monitoring target information 40 runs outside of the maximum area 212, when all pieces of monitoring target information 40 stored in the storage area 312 are simultaneously displayed at a predetermined font size.

As shown in FIGS. 3 to 10, the display control unit 36 displays character information, as well as numeric, graphic, and symbolic information, and the like configuring the monitoring target information 40 within the display area 211 set by the display area setting unit 35. According to the present embodiment, for example, the display control unit 36 displays the inside of the display area 211 so as to be non-transparent in a color opposing the color of the monitoring target information 40 displayed within the display area 211. As a result, the actual scene in the background of the display area 211 is covered and hidden. Consequently, the monitoring target information 40 displayed within the display area 211 can be prevented from blending into the actual scene in the background of the display area 211. Therefore, the monitoring target information 40 displayed within the display area 211 becomes more visible. The display area 211 is provided to display the monitoring target information 40. Therefore, the display control unit 36 is not necessarily required to display a border that marks the display area 211 or to display the inside of the display area 211 in color.

Here, solid borders 44, 45, and 46 shown in FIGS. 3 to 10 indicate pieces of information, among the monitoring target information 40 stored in the storage area 312, that are displayed in the display area 211 of the HMD 20 by the display control unit 36. In this case, among the monitoring target information 40 stored in the storage area 312, the pieces of information surrounded by the borders 44, 45, and 46 are displayed in the display area 211.

Figure 5:
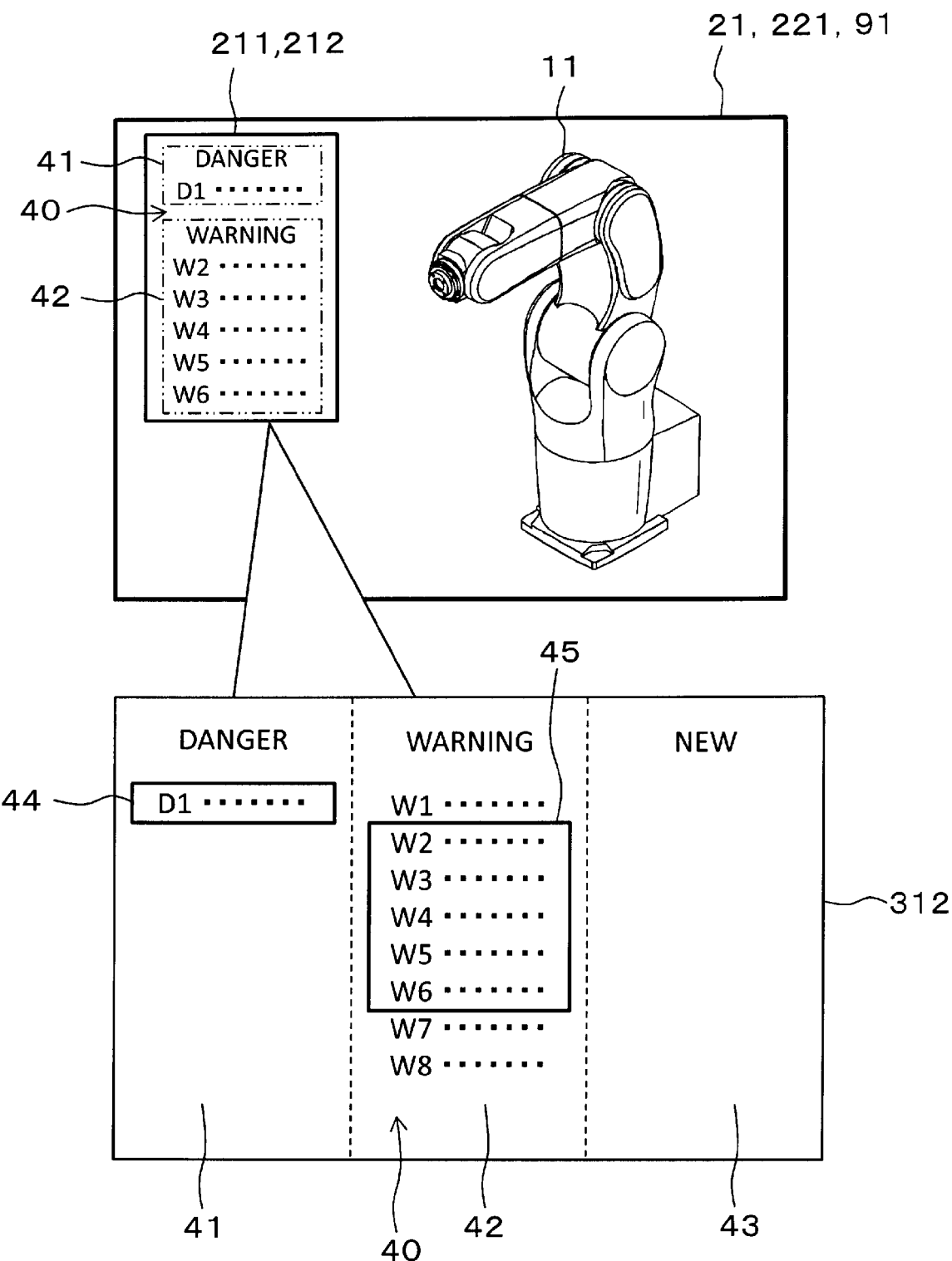
FIG. 5 is a diagram (2) of the example of the field of view visible to the user through the display unit and the monitoring target information in the storage area, in which the monitoring target information is displayed by scrolling display, according to the first embodiment.
Figure 6:
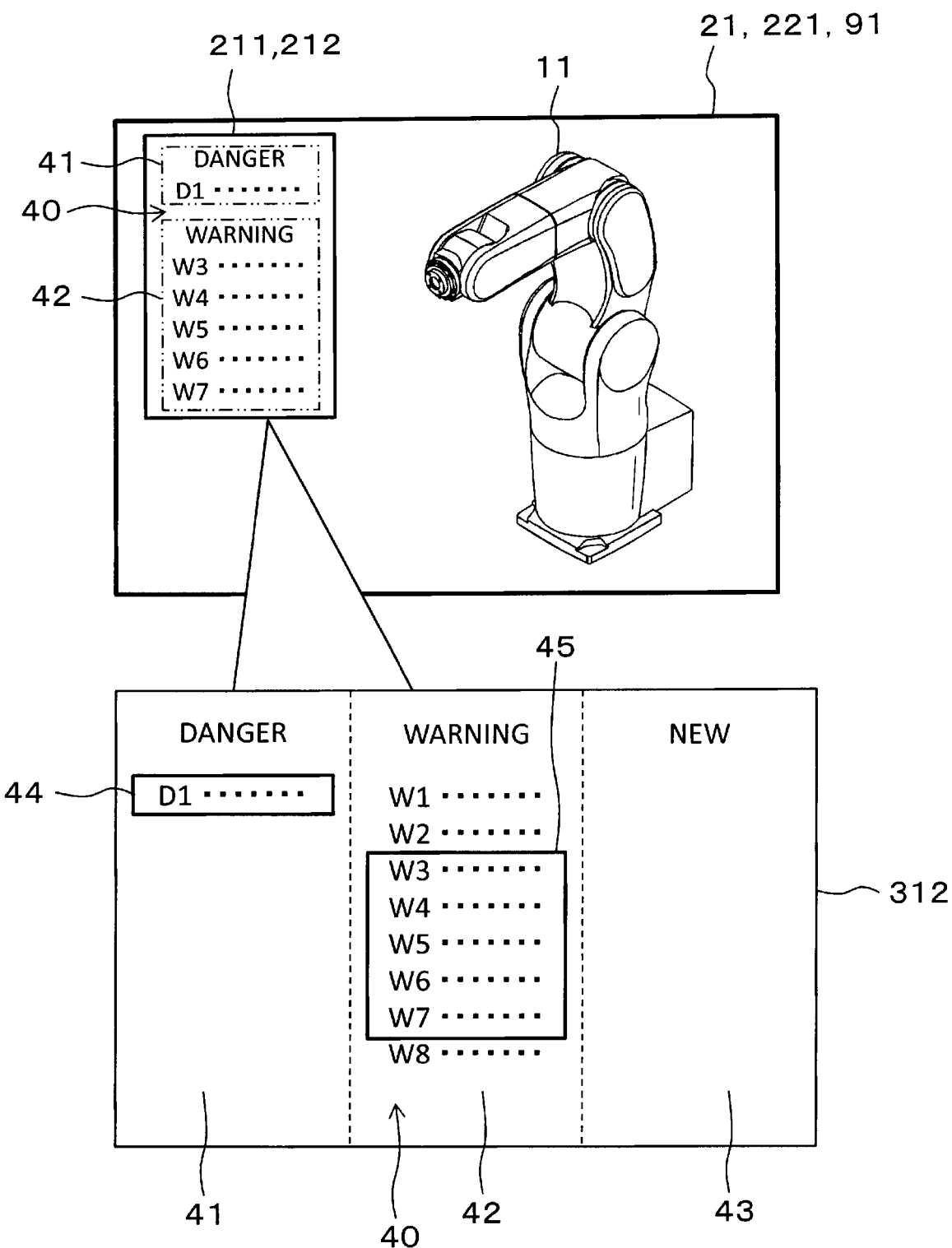
FIG. 6 is a diagram (3) of the example of the field of view visible to the user through the display unit and the monitoring target information stored in the storage area, in which the monitoring target information is displayed by scrolling display, according to the first embodiment.

As shown in FIG. 3, the display control unit 36 simultaneously displays all pieces of monitoring target information 40 within the display area 211 without scrolling, when the amount of information of the monitoring target information 49 fits within the display area 211. Meanwhile, as shown in FIG. 4, when the amount of information of the monitoring target information 40 does not fit within the display area 211, that is, when a portion of the monitoring target information 40 runs outside of the display area 211, as shown in FIG. 4 to FIG. 6 and the like, the display control unit 36 displays all or a portion of the pieces of monitoring target information 40 stored in the storage area 312 within the display area 211 with scrolling at a fixed cycle.

Here, according to the present embodiment, the phrase "display with scrolling" and the phrase "display by scrolling display" are synonymous. In addition, "display with scrolling" and "display by scrolling display" refers to a display aspect in which the pieces of monitoring target information 40 that do not fit within the display area 211 are displayed in a horizontally or vertically sliding manner. In addition, the term "scrolling cycle" and the term "scrolling speed" are synonymous.

According to the present embodiment, the display control unit 36 displays all or a portion of the pieces of monitoring target information 40 with scrolling, such that all or a portion of the pieces of monitoring target information 40 flow in an upward direction of the field of view 91. That is, in the examples shown in FIG. 4 to FIG. 6, the number of individual pieces of information of the second rank information 42 displayed within the display area 211 is fixed at five pieces. The five individual pieces of information are displayed so as to be successively switched. When all individual pieces of information of the second rank information 42 have been displayed by scrolling display, the scrolling display returns again to the beginning and is repeated. That is, according to the present embodiment, the display control unit 36 displays the individual pieces of information of the second rank information 42 so as to be scrolled repeatedly at a fixed cycle.

In this case, the speed of the scrolling display, that is, the speed at which the monitoring target information 40 flows in the upward direction can be fixed, regardless of the amount of information of the monitoring target information 40. According to the present embodiment, in relation to the scrolling display, a display aspect in which scrolling is not performed, that is, information is displayed so as to fixed to a fixed location is referred to non-scrolling display.

The display control unit 36 continues scrolling display of the monitoring target information 40 until the amount of information of the monitoring target information 40 acquired by the monitoring target information 32 decreases and display of the monitoring target information 40 fits within the display area 211. That is, when the amount of information of the monitoring target information 40 acquired by the monitoring target information 32 decreases and display of the monitoring target information 40 fits within the display area 211, the display control unit 36 switches from scrolling display to non-scrolling display of the monitoring target information 40.

According to the present embodiment, as shown in FIG. 4 to FIG. 10, the display control unit 36 displays the first rank information 41 and the new information 43, among the monitoring target information 40, by non-scrolling display at all times. In addition, the display control unit 36 displays the second rank information 42, among the monitoring target information 40, while switching between scrolling display and non-scrolling display as required, that is, based on the amount of information of the monitoring target information 40.

That is, when the monitoring target information 40 includes the first rank information 41, the display control unit 36 displays the first rank information 41 within the display area 211 at all times without scrolling, regardless of the amount of information of the monitoring target information 40. In addition, when the monitoring target information 40 includes the second rank information 42 and fits within the maximum area 212, the display control unit 36 displays the second rank information 42, together with the first rank information 41, within the display area 211 at all times without scrolling. Meanwhile, when the monitoring target information 40 includes the second rank information 42 but does not fit within the maximum area 212, the display control unit 36 displays the second rank information 42 within the display area 211 with scrolling.

Figure 7:
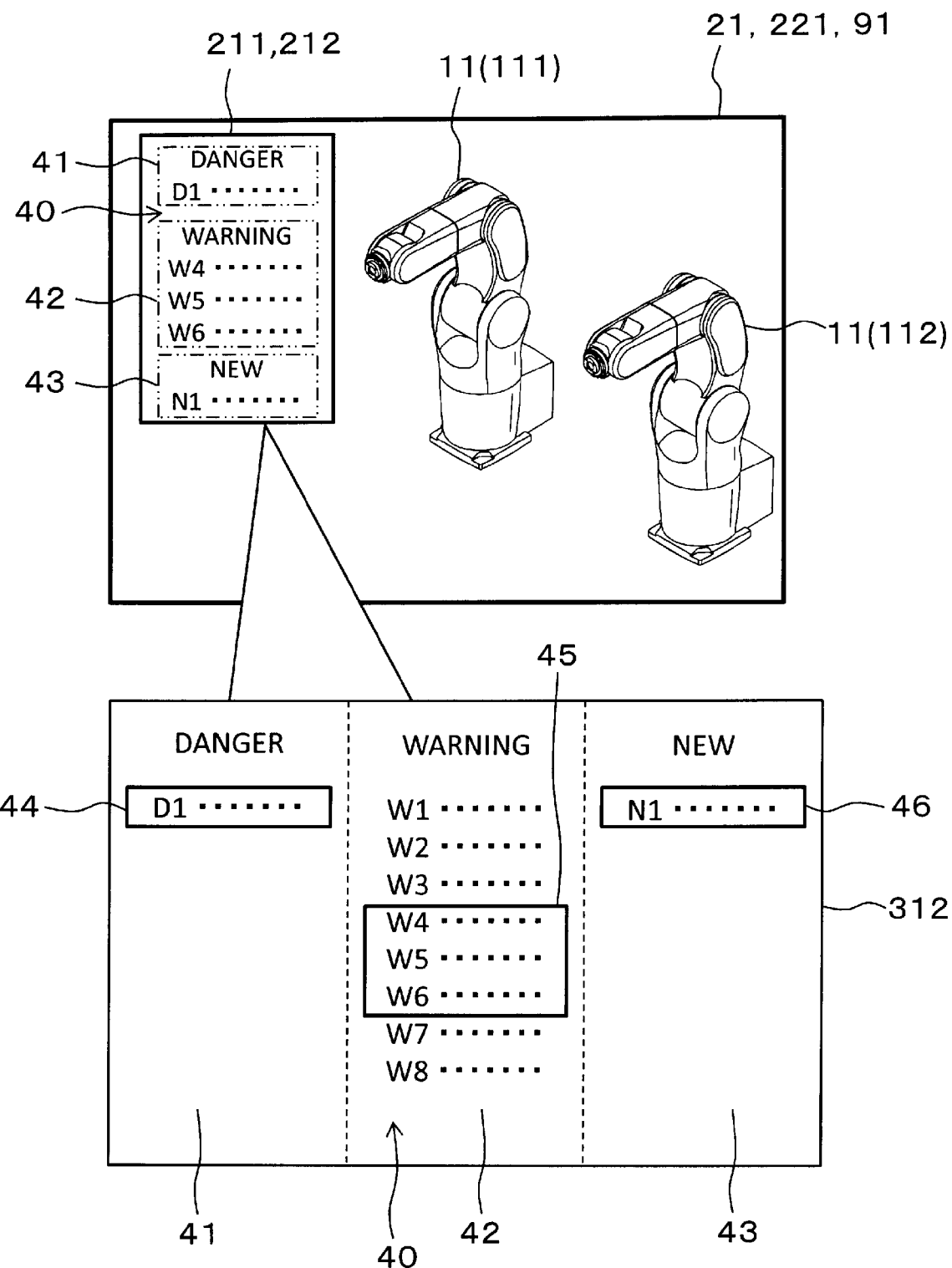
FIG. 7 is a diagram of an example of the field of view visible to the user through the display unit and the monitoring target information stored in the storage area, in which new information is added, according to the first embodiment.

In addition, regardless of the content of the control performed by the display control unit 36, the monitoring target information acquiring unit 32 continuously acquires the monitoring target information 40 from the safety apparatus 13. In this case, as indicated through a comparison between FIG. 6 and FIG. 7, when the field of view 91 of the user changes or the state of the robot 11 changes, the monitoring target information acquiring unit 32 acquires new information 43 that is not stored in the storage area 312. Then, as shown in FIG. 7, the display control unit 36 displays the new information 43 that has been newly acquired within the display area 211 without scrolling, that is, by non-scrolling display for a predetermined period. In this case, when a plurality of pieces of new information 43 that has been newly acquired is present, the display control unit 36 displays at least the newest piece of new information 43, that is, the piece of new information 43 that has been acquired last, within the display area 211 by non-scrolling display.

In addition, in this case, the predetermined period may be arbitrarily set by the user in advance. Alternatively, the predetermined period may be set to an amount of time such as from about 10 seconds to one minute by the manufacturer or the like in advance. Furthermore, the predetermined period can also be variably set in correspondence to the cycle of the scrolling display of the second rank information 42. For example, when the predetermined period is set to a single cycle of the scrolling display of the second rank information 42, the display control unit 36 displays the new information 43 at all times by non-scrolling display during a period over which the scrolling display of the second rank information 42 makes a single cycle, that is, during a period over which an individual piece of information of the second rank information 42 makes a single cycle and returns again to the same position.

Figure 8:
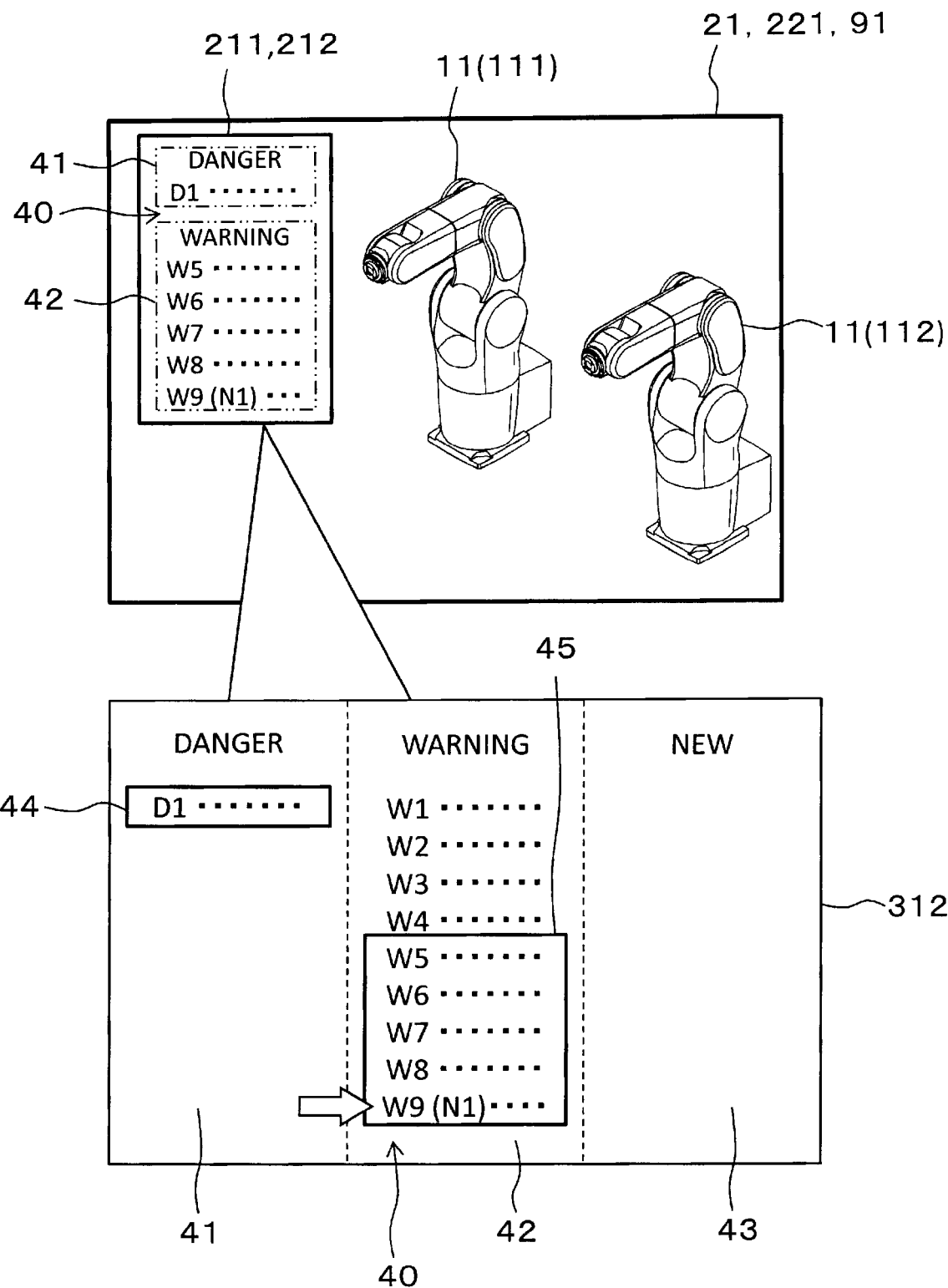
FIG. 8 is a diagram (1) of an example of the field of view visible to the user through the display unit and the monitoring target information stored in the storage area, in which new information is incorporated into second rank information, according to the first embodiment.
Figure 9:
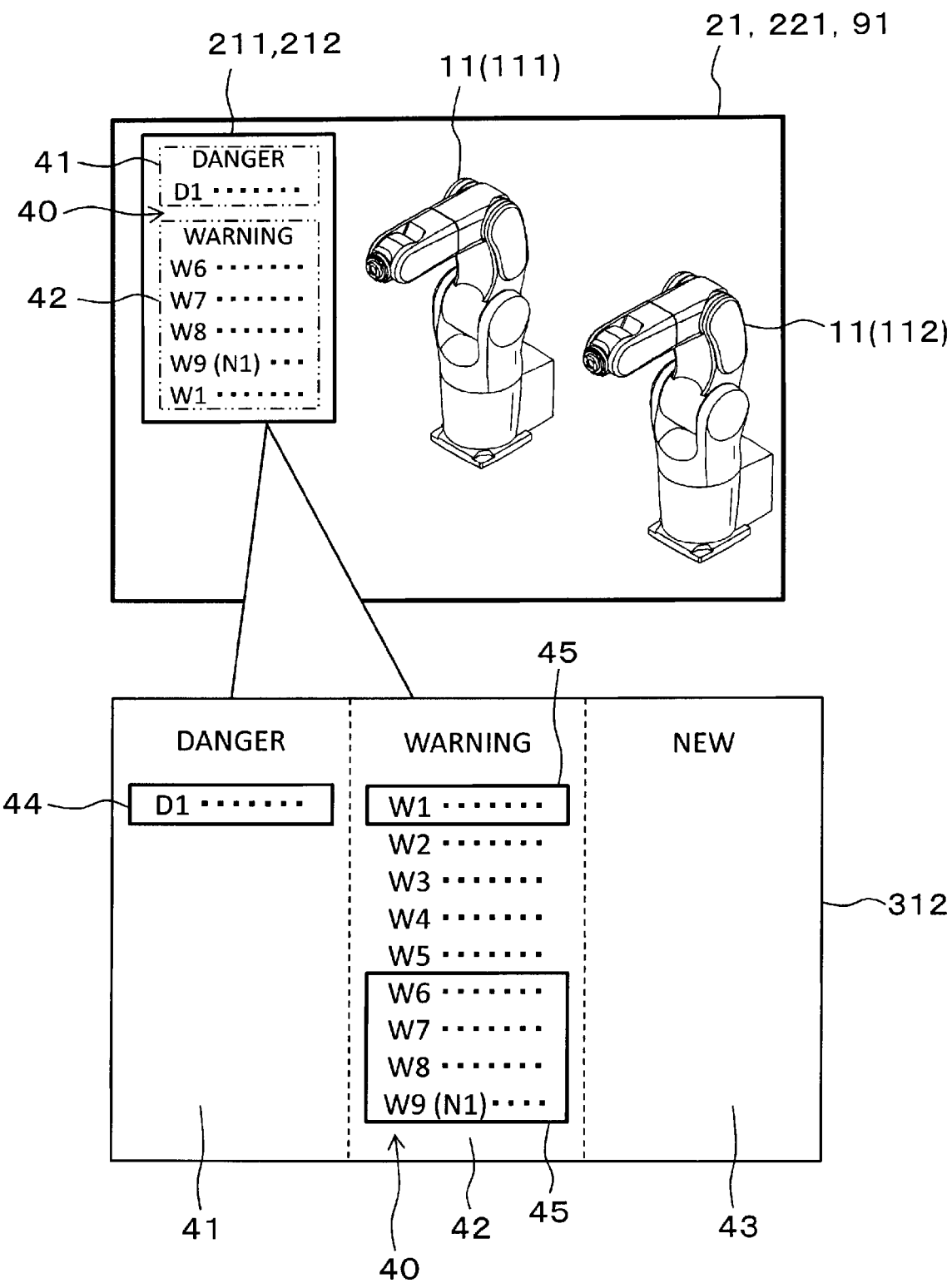
FIG. 9 is a diagram (2) of the example of the field of view visible to the user through the display unit and the monitoring target information stored in the storage area, in which new information is incorporated into the second rank information, according to the first embodiment.

After the new information 43 is displayed by non-scrolling display over the predetermined period, should the new information 43 belong to the second rank information 42, as indicated by a white arrow in FIG. 8, the display control unit 36 adds the new information 43 to the end of the second rank information 42. In this case, the display control unit 36 adds the new information 43 to the second rank information 42 as an individual piece of information W9. Then, as shown in FIG. 9, the display control unit 36 displays the second rank information 42 including the added individual piece of information W9 by scrolling display. That is, when the new information 43 belongs to the second rank information 42, the display control unit 36 displays the new information 43 by non-scrolling display over the predetermined period. Subsequently, the display control unit 36 incorporates the new information 43 into the scrolling display of the second rank information 42.

Meanwhile, when the new information 43 belongs to the first rank information 41, as indicated by a white arrow in FIG. 10, the display control unit 36 adds the new information 43 to the end of the first rank information 41. In this case, the display control unit 36 adds the new information 43 to the first rank information 41 as an individual piece of information D2. Then, as shown in FIG. 10, the display control unit 36 displays the first rank information 41 including the added individual piece of information D2 by non-scrolling display.

Here, the scrolling display of the second rank information 42 can be set to a fixed speed regardless of the amount of information of the second rank information 42. In this case, when the amount of information of the second rank information 42 is small, the period over which the second rank information 42 makes a single cycle by scrolling display is short. Therefore, the amount of time over which the new information 43 is displayed by non-scrolling display is also short. However, because the period over which the second rank information 42 makes a single cycle is short, the user is able to view the new information 43 that has been incorporated into the second rank information 42 with relative frequency, even after the new information 43 has been added to the second rank information 42.

In addition, in cases in which the scrolling display of the second rank information 42 is set to a fixed speed, when the amount of information of the second rank information 42 is large, the period over which the second rank information 42 makes a single cycle by scrolling display is long. Therefore, the frequency at which the user views the new information 43 that has been incorporated into the second rank information 42 after the new information 43 has been added to the second rank information 42 becomes low. However, in this case, the amount of time over which the new information 43 is displayed by non-scrolling display before being added to the second rank information 42 is long. Therefore, as a result of this configuration, time for the user to confirm the new information 43 can be sufficiently ensured regardless of the amount of information of the second rank information 42.

In addition, the display control unit 36 repeatedly displays the second rank information 42 with scrolling at a fixed cycle. In this case, for example, the scrolling speed can be increased and the period of a single cycle can be shortened, as the amount of information of the monitoring target information 40 to be displayed by scrolling display increases. In other words, the display control unit 36 may reduce the scrolling speed and lengthen the period of a single cycle, as the amount of information of the monitoring target information 40 to be displayed by scrolling display decreases. As a result, even when the amount of information of the monitoring target information 40 increases, the period of a single scrolling cycle can be shortened to the greatest possible extent. Therefore, when the user wishes to view a specific piece of information among the second rank information 42 that is being scrolled, the user can view the targeted piece of information as quickly as possible.

Furthermore, the user can estimate the magnitude of the amount of information of the second rank information 42 based on the scrolling speed of the second rank information 42 that is repeatedly scrolled, that is, the length of time until the same individual piece of information of the second rank information 42 is displayed again. Therefore, the user can intuitively visually confirm the magnitude of the amount of information of the second rank information 42, that is, the magnitude of the number of pieces of information related to danger and thus experiences convenience.

Figure 11:
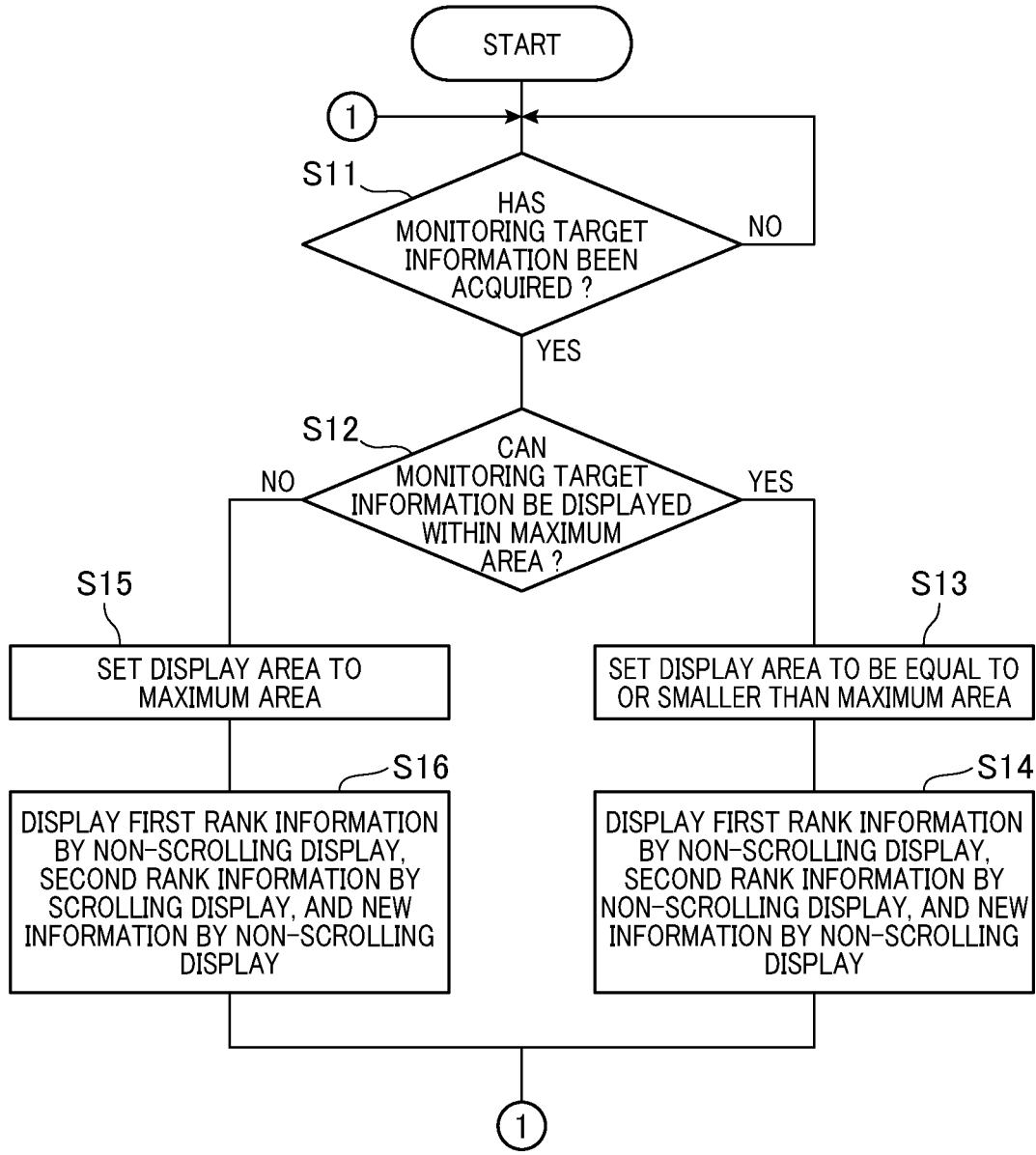
FIG. 11 is a flowchart of the content of a process performed by a control unit of a display control apparatus according to the first embodiment.

Next, the flow of control performed by the control unit 31 of the display control apparatus 30 will be described with reference to FIG. 11 as well. When the control unit 31 runs the information display program, the control unit 31 performs the flow of control in FIG. 11. First, at step S11, the control unit 31 determines whether or not the monitoring target information acquiring unit 32 has acquired the monitoring target information 40. When determined that the monitoring target information acquiring unit 32 has not acquired the monitoring target information 40 (NO at step S11), the control unit 31 determines that the monitoring target information 40 to be displayed within the field of view 91 is not present. The control unit 31 returns the process to step S11 and repeatedly performs step S11.

Meanwhile, when determined that the monitoring target information acquiring unit 32 has acquired the monitoring target information 40 (YES at step S11), the control unit 31 determines that the monitoring target information 40 to be displayed in the field of view 91 is present. The control unit 31 shifts the process to step S12. At step S12, the control unit 31 determines whether or not the amount of information of the acquired monitoring target information 40 fits within the maximum area 212. When determined that the amount of information of the acquired monitoring target information 40 fits within the maximum area 212 (YES at step S12), the control unit 31 sets the size of the display area 211 to be equal to or smaller than the size of the maximum display area 212 by the process performed by the display area setting unit 35.

Then, the control unit 31 shifts the process to step S14 and displays the first rank information 41, the second rank information 42, and the new information 43 among the monitoring target information 40, that is, all pieces of the monitoring target information 40 within the display area 211 by non-scrolling display, by the process performed by the display control unit 36. Subsequently, the control unit 31 shifts the process to step S11, and repeatedly performs step S11 and subsequent steps.

Meanwhile, when determined that the amount of information of the acquired monitoring target information 40 does not fit within the maximum area 212 (NO at step S12), the control unit 31 sets the size of the display area 211 to the same size as that of the maximum display area 212 by the process performed by the display area setting unit 35. Then, the control unit 31 shifts the process to step S15. The control unit 31 displays the first rank information 41 and the new information 43 among the monitoring target information 40 within the display area 211 by non-scrolling display, by the process performed by the display control unit 36. In addition, the control unit 21 displays the second rank information 42 within the display area 211 by scrolling display, by the process performed by the display control unit 36. Subsequently, the control unit 31 shifts the process to step S11, and repeatedly performs step S11 and subsequent steps.

According to the embodiment described above, in the information display system 10, when the amount of information of the monitoring target information 40 fits within the display area 211, the display control unit 36 displays the monitoring target information 40 within the display area 211 without scrolling. Meanwhile, when the amount of information of the monitoring target information 40 does not fit within the display area 211, the display control unit 36 displays the second rank information 42 among the monitoring target information 40 within the display area 211 with scrolling.

As a result, even when the amount of information of the monitoring target information 40 to be displayed within the field of view 91 is large, it is not necessary to enlarge the display area 211 within the field of view 91 and simultaneously display all pieces of monitoring target information 40. Therefore, even when the amount of information of the monitoring target information 40 is large, a situation in which the field of view 91 becomes filled with the monitoring target information 40 and obstructed can be suppressed. That is, as a result of the monitoring target information 40 of which the amount of information is large being displayed with scrolling, all pieces of monitoring target information 40 can be efficiently displayed while making the display area 211 as small as possible. Consequently, a safe information presentation in which the field of view 91 of the user 90 is not easily obstructed can be achieved.

In addition, according to the present embodiment, the display area setting unit 35 sets the display area 211 in correspondence to the amount of information of the monitoring target information 40, such that the monitoring target information 40 can be displayed without scrolling, in cases in which the amount of information of the monitoring target information 40 fits within the maximum area 212 that is set in advance. In addition, the display area setting unit 35 sets the display area 211 to be the same size as the maximum area 212 in cases in which the amount of information of the monitoring target information 40 does not fit within the maximum area 212.

As a result, when the amount of information of the monitoring target information 40 is small, the display area 211 can be made small in correspondence to the monitoring target information 40. Therefore, the field of view 91 of the user 90 is further less easily obstructed. Moreover, as a result, the display area 211 does not become larger than the maximum display area 212. Therefore, the user 90 can be provided with a feeling of security that the field of view 91 will not be obstructed any further than the maximum area 211. Consequently, a safer information presentation in which the field of view 91 of the user 91 is further less easily obstructed can be achieved.

Furthermore, according to the present embodiment, the monitoring target information 40 is classified into at least the first rank information 41 and the second rank information 42 based on the magnitude of danger. The first rank information 41 indicates information of which the degree of danger is high. The second rank information 42 indicates information of which the degree of danger is lower than that of the first rank information 41. The display control unit 36 displays the first rank information 41 of which the degree of danger is higher among the monitoring target information 40 at all times. In addition, when the amount of information of the second rank information 42 does not fit within the display area 211, the display control unit 36 displays, with scrolling, the second rank information 42 of which the degree of danger is relatively low among the monitoring target information 40.

As a result, the first rank information 41 of which the degree of danger is high is displayed within the field of view 91 at all times. Therefore, the user can be aware of the first rank information 41 of which the degree of danger is high at all times. In addition, the second rank information 42 of which the degree of danger is low is displayed with scrolling. Therefore, even when the amount of information of the monitoring target information 40 is large, the display area 211 can be made small. As a result, the overall display area 211 can be reduced while further facilitating confirmation of information of which the degree of danger is high. Consequently, a safer information presentation in which the field of view 91 of the user 90 is further less easily obstructed can be achieved.

Here, the display control unit 36 may increase the scrolling speed as the amount of information of the second rank information 42 increases. As a result, even when the amount of information of the second rank information 42 becomes large, the period of a single scrolling cycle can be made as short as possible. Therefore, when the user wishes to view a specific individual piece of information among the second rank information 42 that is being scrolled, the user can view the targeted individual piece of information as quickly as possible. In addition, the user 90 can more intuitively visually confirm the amount of information of the second rank information 42 based on the scrolling speed and thus experience convenience.

In addition, according to the present embodiment, the display control unit 36 displays the monitoring target information 40 that is newly acquired by the monitoring target information acquiring unit 32, that is, the new information 43 without scrolling for a predetermined period. As a result, regarding the newly added monitoring target information 40, that is, the new information 43, a period during which the user 90 can be aware of the new information 43 separately from the other monitoring target information 40 can be secured. Therefore, the user 90 can be aware of the new information 43 with further certainty. Consequently, a safer information presentation can be achieved.

Furthermore, according to the present embodiment, the display control unit 36 displays the inside of the display area 211 so as to be non-transparent. As a result, the monitoring target information 40 displayed within the display area 211 can be prevented from blending with the actual scene in the background of the display area 211. Consequently, the monitoring target information 40 can be made more easily visible.

Second Embodiment

Next, a second embodiment will be described with reference to FIG. 12 to FIG. 16.

According to the present embodiment, a following state is assumed. That is, the display control unit 36 displays the second rank information 42, among the monitoring target information 40 stored in the storage area 312, by scrolling display at a fixed cycle because the amount of information of the monitoring target information 40 does not fit within the display area 211 that is set to the maximum area 212.

Figure 12:
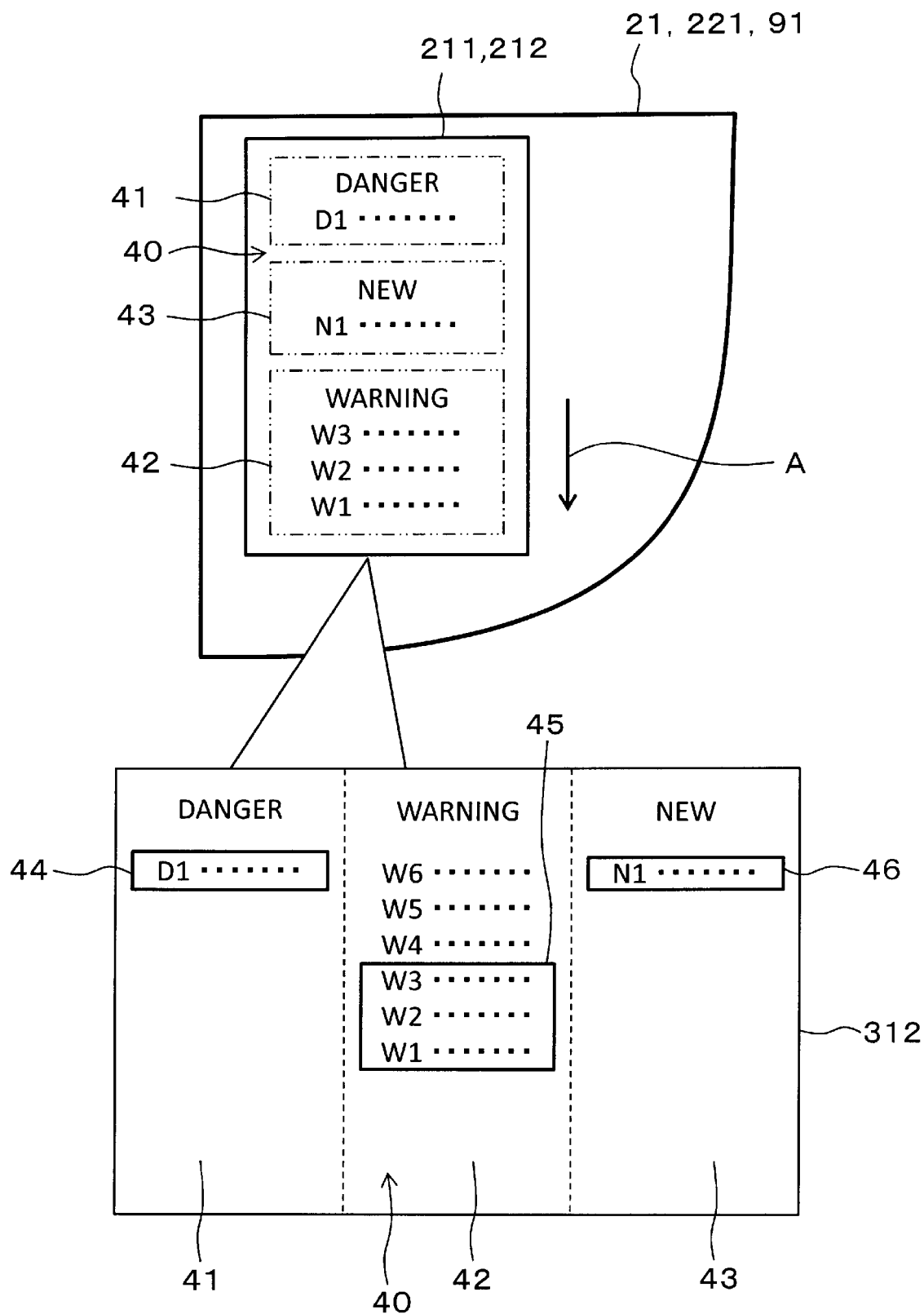
FIG. 12 is a diagram (1) of an example of a portion of a field of view visible to a user through a display unit and monitoring target information stored in a storage area, according to a second embodiment.

In this case, as indicated by an arrow A in FIG. 12, the second rank information 42 is displayed by scrolling display so as to flow in a downward direction of the field of view 91. In addition, within the display area 211, a newest piece of the new information 43 to which the characters "NEW" are attached is displayed above the second rank information 42 to which the characters "WARNING" are attached. Therefore, the second rank information 42 is displayed so as to scroll in a direction away from a display position of the newest piece of new information 43.

In the description according to the present embodiment, numbers N1, N2, . . . are attached to the pieces of new information 43 in the order of acquisition. In this case, the numbers indicate that the piece of new information 43 to which N1 is attached has been acquired before the piece of new information 43 to which N2 is attached. Among the pieces of new information 43, the piece of new information 43 to which the largest number is attached is the newest piece of new information 43. In the description below, in cases in which the pieces of new information 43 are differentiated based on the order of acquisition, the numbers are attached to the pieces of new information 43 in parentheses, such as new information 43 (N1) and new information 43 (N2).

In addition, according to the present embodiment, among the newly acquired new information 43, at least the newest piece of new information 43 is displayed without scrolling over a predetermined period. The predetermined period is similar to the predetermined period according to the first embodiment. For example, the predetermined period may be arbitrarily set by the user. Alternatively, the predetermined period may be set to an amount of time such as from about 10 seconds to one minute by the manufacturer or the like in advance. Furthermore, the predetermined period can also be variably set in correspondence to the cycle of the scrolling display of the second rank information 42

Moreover, according to the present embodiment, a case in which the monitoring target information acquiring unit 32 continuously acquires a plurality of pieces of new information 43 is assumed. According to the present embodiment, a plurality of pieces of new information 43 being continuously acquired means that a period from the acquisition of a previous piece of new information 43 to the acquisition of a next piece of new information 43 does not elapse the above-described predetermined period over which the newest piece of new information 43 is displayed without scrolling.

Here, according to the above-described first embodiment, the maximum size of the display area 211, that is, the maximum area 212 is set in advance. Therefore, the number of pieces of monitoring target information 41, 42, and 43 that can be simultaneously displayed within the display area 211 is limited. As a result, when the monitoring target information acquiring unit 32 continuously acquires a plurality of pieces of new information 43 over a short period, a portion of the pieces of newly acquired new information 43 may not be displayed within the display area 211.

Therefore, according to the present embodiment, when the next piece of monitoring target information 43 is acquired while the previous piece of monitoring target information 43 acquired by the monitoring target information acquiring unit 32 is being displayed without scrolling, that is, before the elapse of the predetermined period, the display control unit 36 displays the next piece of monitoring target information 43 as the newest piece of monitoring target information 43 without scrolling. In addition, the display control unit 36 inserts the previous piece of monitoring target information 43 into the other monitoring target information 42 that is already being displayed with scrolling, and displays the previous piece monitoring target information 43 with scrolling.

That is, when the monitoring target information acquiring unit 32 continuously acquires a plurality of pieces of new information 43, the display control unit 36 displays the piece of new information 43 that is currently the newest within the display area 211 without scrolling. The display control unit 36 displays the pieces of new information 43 other than the newest piece of new information 43 within the display area 211 with scrolling, together with the second rank information 42. According to the present embodiment, as shown in FIG. 12 and the like, the second rank information 42 is displayed by scrolling display under the characters "WARNING" that indicate that the information is the second rank information 42. In addition, the newest piece of new information 43 is displayed by non-scrolling display under the characters "NEW" that indicate that the information is the newest piece of new information 43.

Specifically, as shown in FIG. 12, for example, first, when the monitoring target information acquiring unit 32 acquires the new information 43 (N1), the new information 43 (N1) is stored in the storage area 312. At this time, new information 43 other than the new information 43 (N1) is not stored in the storage area 312. Therefore, the new information 43 (N1) becomes the current newest piece of new information 43. Then, as shown in the drawings from FIG. 12 to FIG. 13, the display control unit 36 displays the newest piece of new information 43 (N1) within the display area 211 by non-scrolling display. In addition, the display control unit 36 successively displays the pieces of second rank information 42 within the display area 211 by scrolling display.

Figure 14:
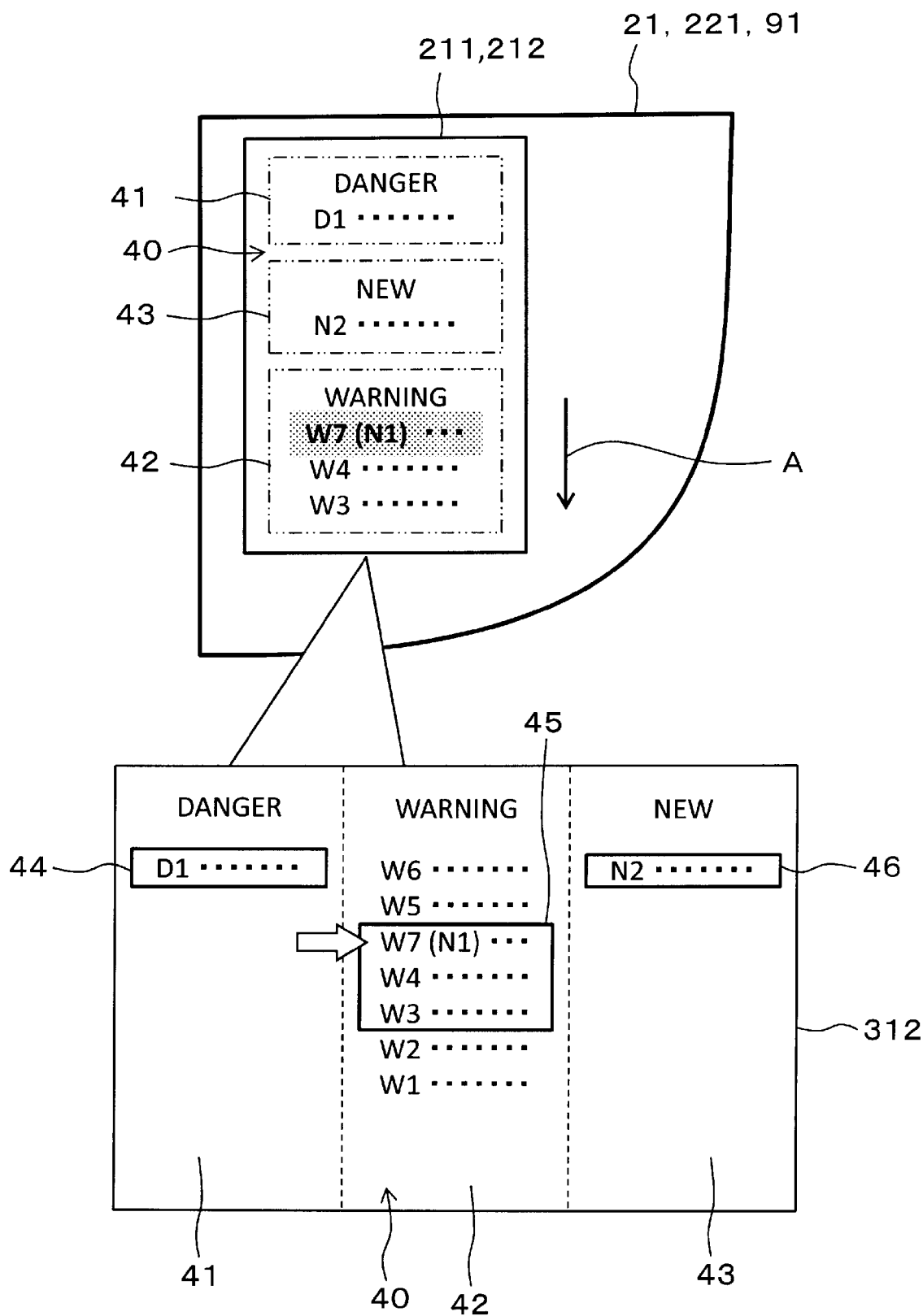
FIG. 14 is a diagram (3) of the example of a portion of the field of view visible to the user through the display unit and the monitoring target information stored in the storage area, according to the second embodiment.
Figure 15:
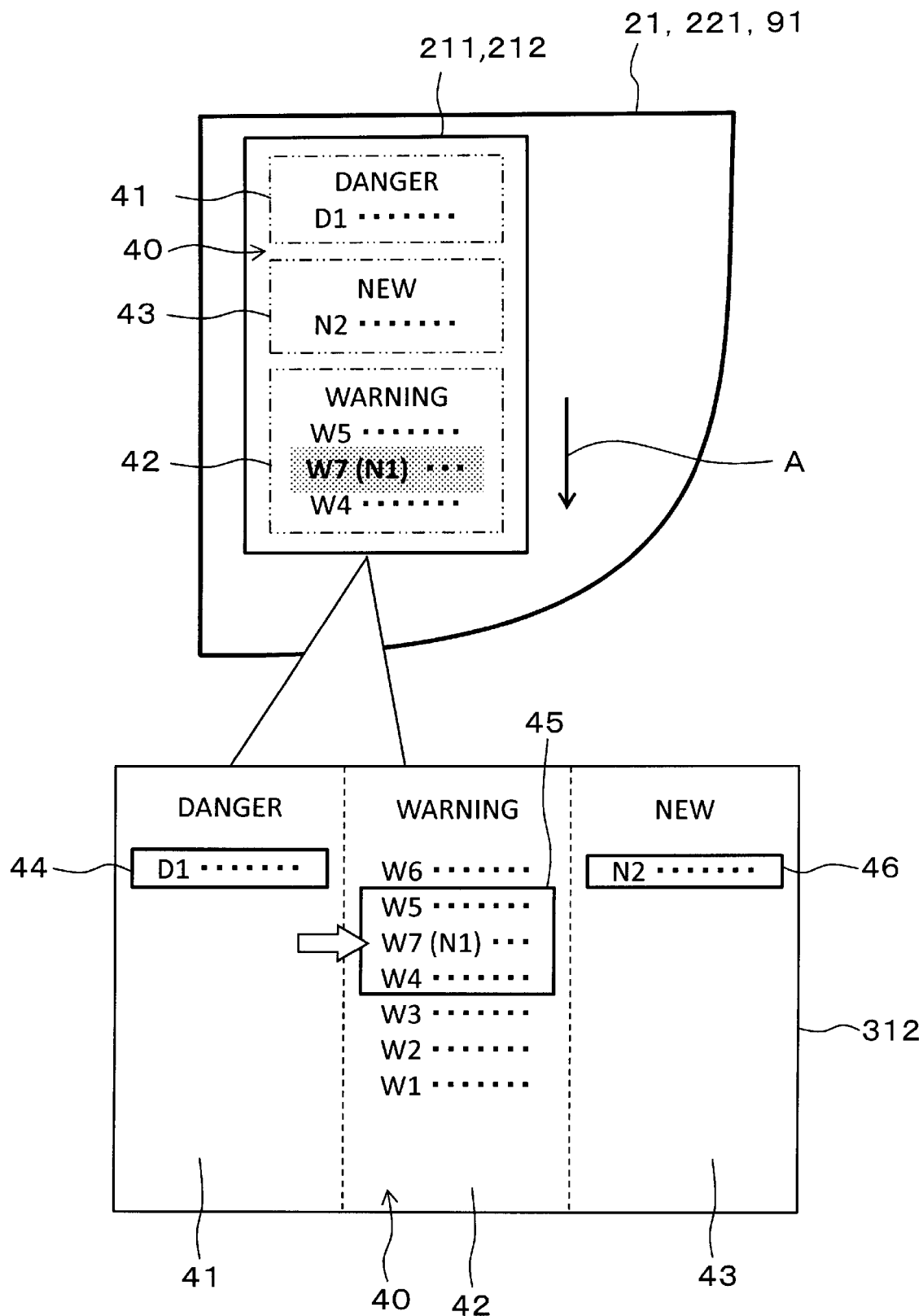
FIG. 15 is a diagram (4) of the example of a portion of the field of view visible to the user through the display unit and the monitoring target information stored in the storage area, according to the second embodiment.
Figure 16:
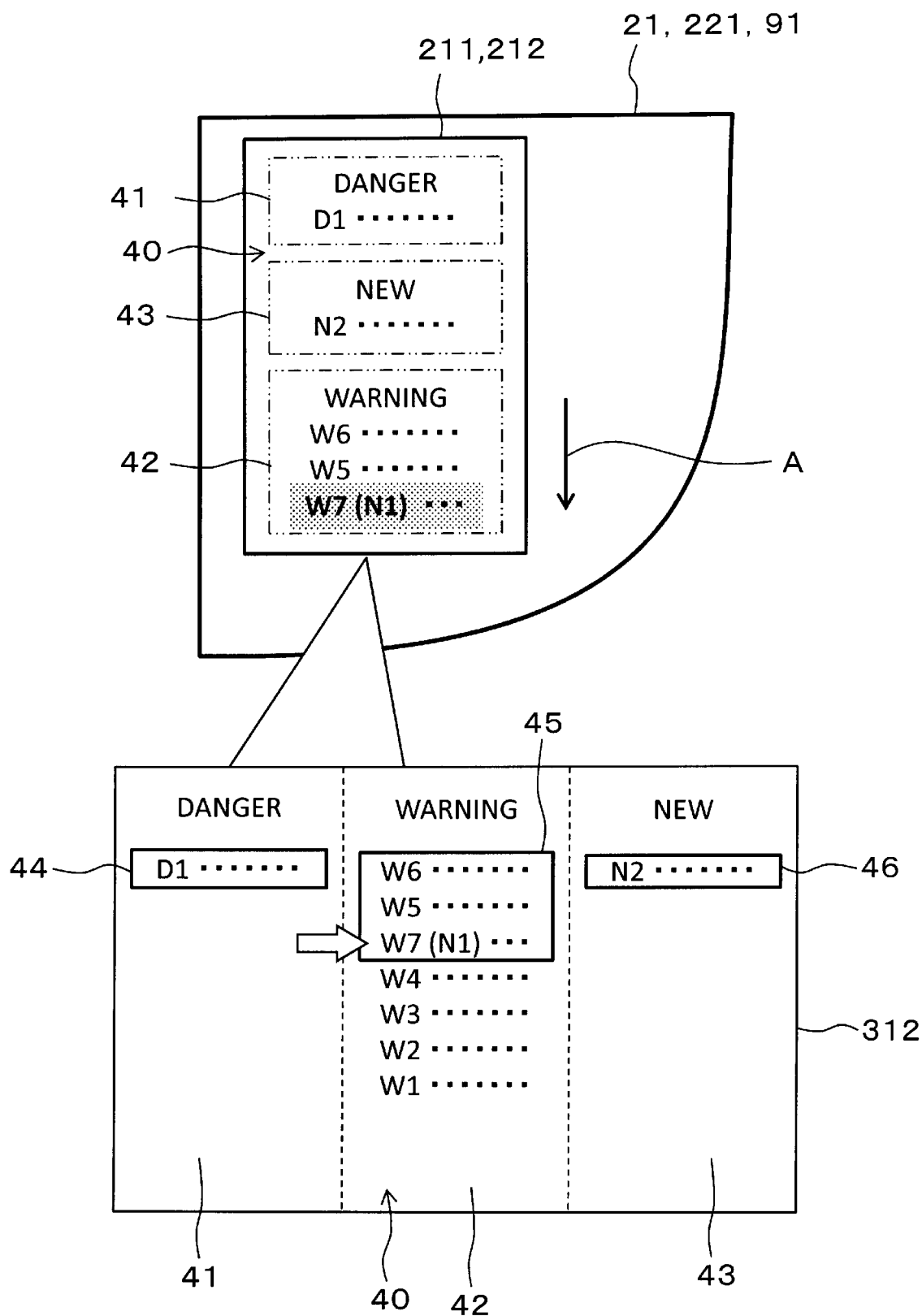
FIG. 16 is a diagram (5) of the example of a portion of the field of view visible to the user through the display unit and the monitoring target information stored in the storage area, according to the second embodiment.
Figure 17:
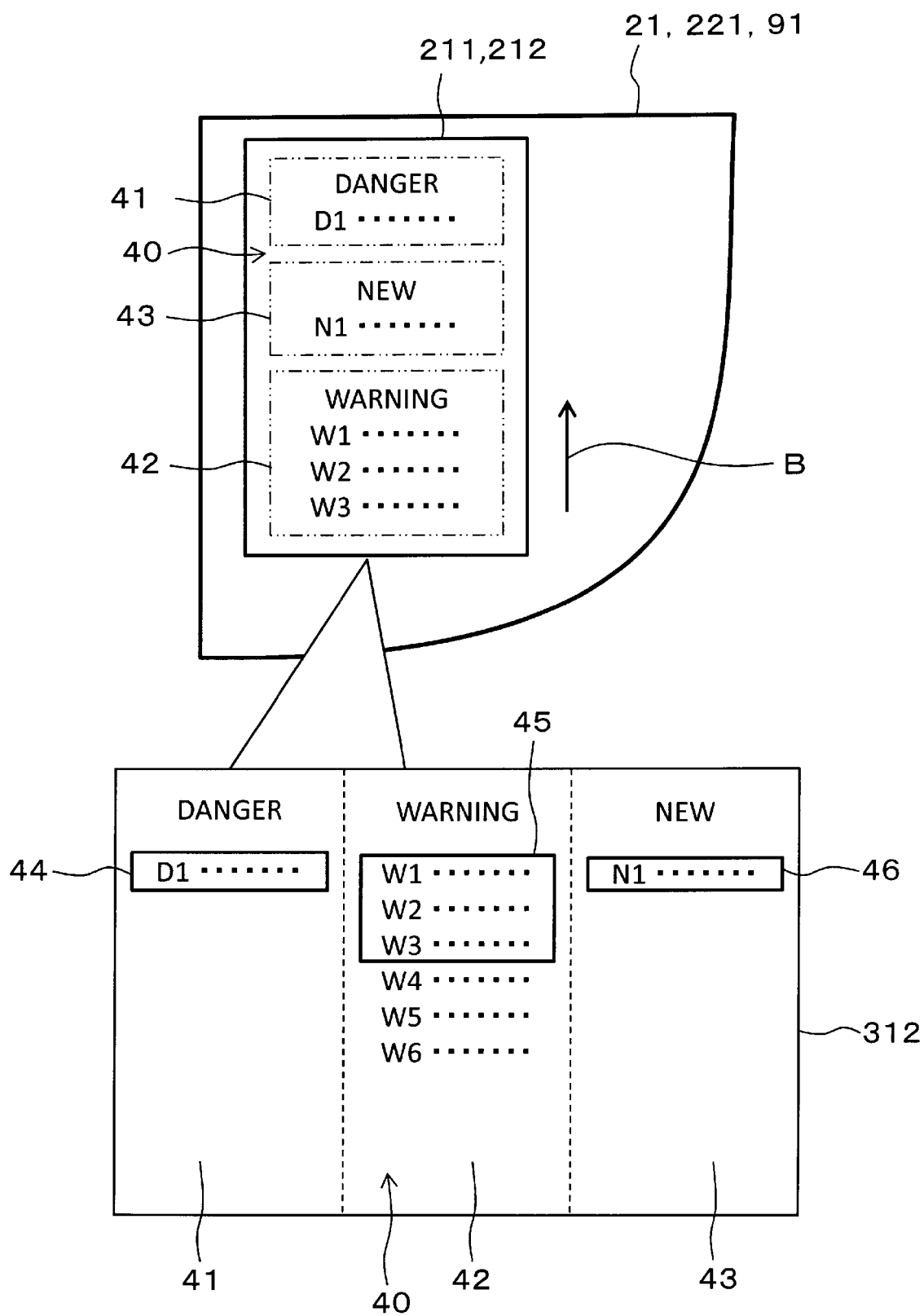
FIG. 17 is a diagram (1) of an example of a portion of a field of view visible to a user through a display unit and monitoring target information stored in a storage area, according to a third embodiment.
Figure 18:
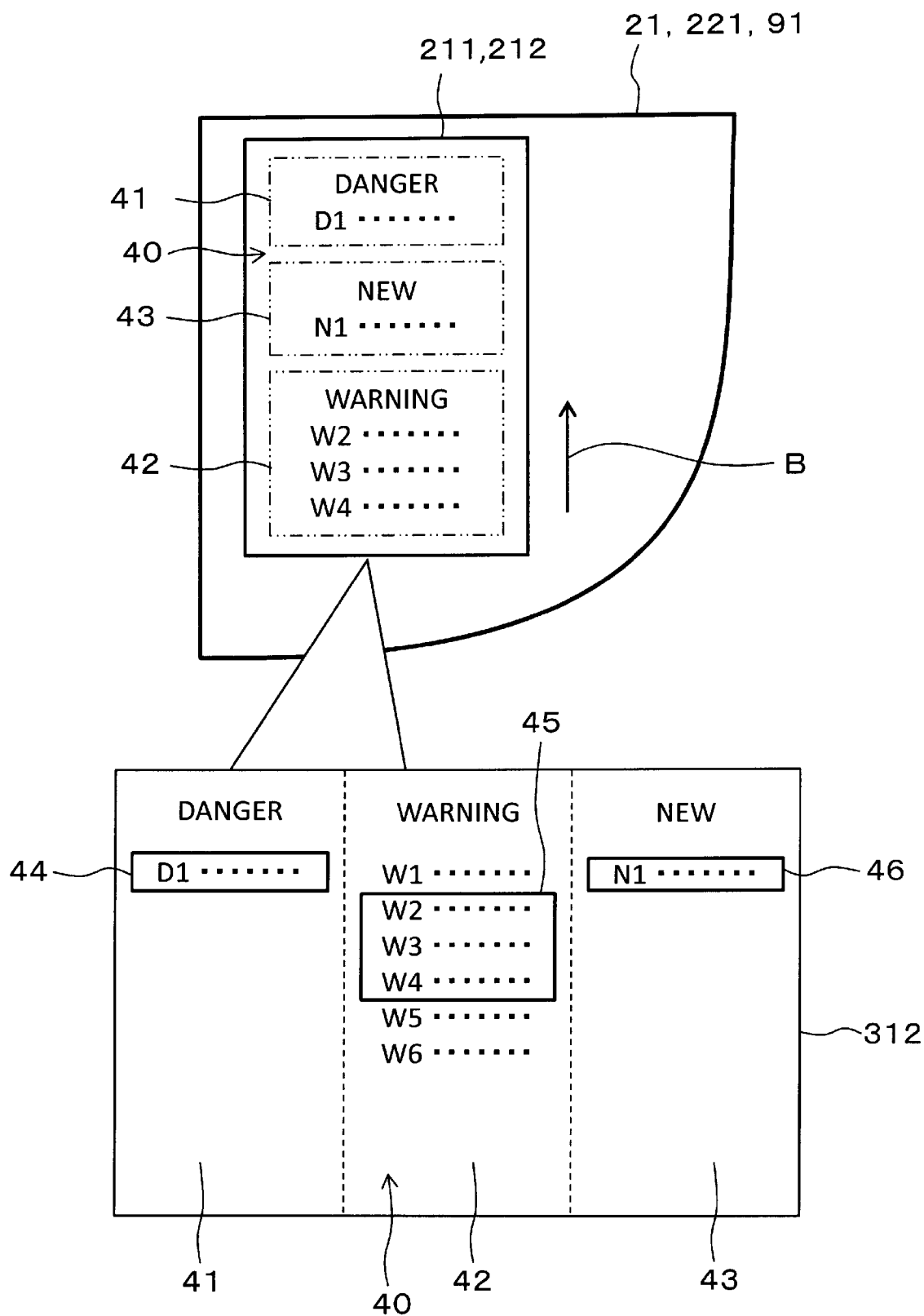
FIG. 18 is a diagram (2) of the example of a portion of the field of view visible to the user through the display unit and the monitoring target information stored in the storage area, according to the third embodiment.

Next, as shown in FIG. 14, when the monitoring target information acquiring unit 32 acquires the next piece of new information 43 (N2), the new information 43 (N2) is stored in the storage area 312 and becomes the current newest piece of new information 43. Then, the display control unit 36 replaces the previous piece of new information 43 (N1) with the newest piece of new information 43 (N2) and displays the newest piece of new information 43 (N2) by non-scrolling display. That is, in this case, the newest piece of new information 43 (N2) is displayed by non-scrolling display under the characters "NEW" that indicate that the information is the newest piece of new information 43. In addition, as shown in the drawings from FIG. 14 to FIG. 16, the display control unit 36 inserts the previous piece of new information 43 (N1) into the second rank information 42 that is already being displayed by scrolling display and displays the new information 43 (N1) together with the second rank information 42 by scrolling display.

Figure 13:
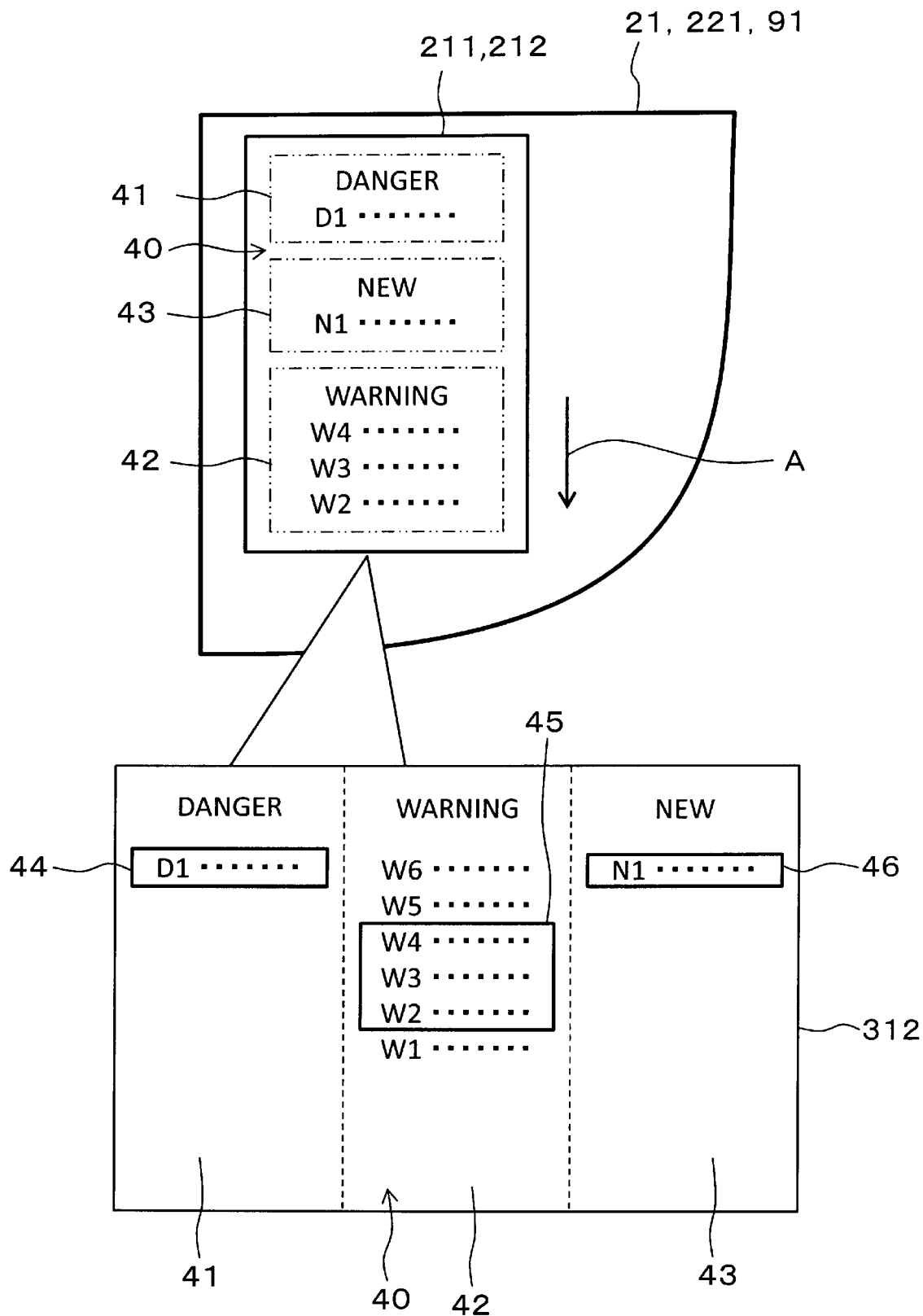
FIG. 13 is a diagram (2) of the example of a portion of the field of view visible to the user through the display unit and the monitoring target information in the storage area, according to the second embodiment.

In this case, as indicated by a white arrow in FIG. 14, the previous piece of new information 43 (N1) is incorporated into the pieces of second rank information 42 that are currently actually being displayed in the display area 211, that is, at the end of the pieces of second rank information 42 (W2, W3, and W4) within the border 45 in FIG. 13. Here, in this case, the new information 43 (N1) is acquired even later than the piece of second rank information 42 (W6) that has been acquired last, among the pieces of second rank information 42 stored in the storage area 312. Therefore, the new information 43 (N1) can also be considered to be the second rank information 42 (W7). As a result, as shown in FIG. 14, the display control unit 36 inserts the previous piece of new information 43 (N1) in a position closest to the display position of the newest piece of new information 43 (N2), within the area in which the second rank information 42 is displayed within the display area 211.

For example, in the example shown in the drawings from FIG. 13 to FIG. 14, the display control unit 36 inserts the previous piece of new information 43 (N1) into the display position of the piece of second rank information 43 (W4) that is displayed directly below "WARNING" that indicates the second rank information 42 in FIG. 13. Then, as shown in the drawings from FIG. 14 to FIG. 16, the display control unit 36 displays the previous piece of new information 43 (N1), together with the second rank information 42, in the direction away from the newest piece of new information 43 (N2), that is, in this case, the downward direction.

When the previous piece of new information 43 (N1) is inserted into the other monitoring target information 40, that is, the second rank information 42 that is already being displayed with scrolling, the display control unit 36 displays the previous piece of new information 43 (N1) in a manner differing from the display aspect of the other pieces of second rank information 42 that are already being displayed with scrolling. According to the present embodiment, display in a differing aspect means, for example, the size, font type, or color of the characters of the previous piece of new information 43 (N1) or a color surrounding the previous piece of new information 43 (N1) being set to differ from that of the other pieces of second rank information 42 that are already being displayed by scrolling display. Alternatively, a unique symbol may be attached to the previous piece of new information 43 (N1). In this case, the display aspects of the previous piece of new information 43 (N1) and the other pieces of second rank information 42 are merely required to differ to an extent that the user is able to differentiate between the previous piece of new information 43 (N1) and the other pieces of second rank information 42 at a glance. According to the present embodiment, for example, as shown in the drawings from FIG. 14 to FIG. 16, the display control unit 36 displays the previous piece of new information 43 (N1) that has been inserted so as to be surrounded with a unique color.

Then, after the previous piece of new information 43 (N1) is displayed in the aspect differing from that of the other pieces of second rank information 42 over a predetermined period or at a predetermined cycle, the display control unit 36 displays the previous piece of new information 43 (N1) such that the display aspect is the same as that of the other pieces of second rank information 42. Subsequently, the display control unit 36 includes the previous piece of new information 43 (N1) in the second rank information 42 and repeatedly performs scrolling display, in a manner similar to that according to the above-described first embodiment.

As a result of this configuration, even when the monitoring target information acquiring unit 32 continuously acquires a plurality of pieces of new information 43 over a short period, at least the newest piece of new information 43 can be displayed within the display area 211 without scrolling. As a result, regarding at least the newest piece of new information 43, the user can differentiate the new information 43 from the monitoring target information 41 and 42, and be aware of the new information 43.

In addition, the previous piece of new information 43 (N1 according to the present embodiment) that has been acquired before the acquisition of the newest piece of new information 43 (N2 according to the present embodiment) is also displayed by being inserted into the scrolling display of the other monitoring target information, that is, in this case, the second rank information 42. Therefore, the user is able to confirm the previous piece of monitoring target information, that is, the piece of new information 43 (N1 according to the present embodiment) that had just previously been the newest piece of new information 43 by viewing the display that is scrolling. In this manner, according to the present embodiment, even when a plurality of pieces of new information 43 is continuously generated over a short period, the user is able to simultaneously confirm these pieces of new information 43 (N1 and N2). Consequently, a safer information presentation can be achieved.

Furthermore, the display control unit 36 scrolls the second rank information 42 in the direction away from the display position of the newest piece of new information 43. In addition, the display control unit 36 inserts the previous piece of new information 43 at the end of the pieces of second rank information 42 that are currently being displayed within the display area 211. That is, in the example shown in the drawings from FIG. 13 to FIG. 14, the display control unit 36 scrolls the pieces of second rank information 42 in the direction away from the display position of the newest piece of new information 43 (N2). In addition, the display control unit 36 inserts the previous piece of new information 43 (N1) at the end of the pieces of second rank information 42 that are currently being displayed within the display area 211, that is, in this case, after the piece of second rank information 42 (W4). The display control unit 36 then displays, with scrolling, the inserted previous piece of new information 43 (N1) together with the second rank information 42.

As a result, when the previous piece of new information 43 (N1) is displayed by being inserted into the second rank information 42 that is already being displayed with scrolling, display of the previous piece of new information 43 (N1) can be smoothly switched from display without scrolling to display with scrolling, with an appearance of continuity. Therefore, the user can more easily recognize that the previous piece of new information 43 (N1) that has been inserted into the scrolling second rank information 42 had just previously been the newest piece of new information that had been displayed without scrolling. As a result, the user can more easily be aware of the previous piece of new information 43 (N1) that is being displayed with scrolling, that is, the previous piece of new information 43 (N1) that would be displayed without scrolling if not for the insertion. Consequently, a safer information presentation can be achieved.

In addition, when the previous piece of new information 43 (N1 according to the present embodiment) is displayed by being inserted into the other monitoring target information, that is, in this case, the second rank information that is already being displayed with scrolling, the display control unit 36 displays the previous piece of new information 43 (N1 according to the present embodiment) in a manner differing from the display aspect of the second rank information 42 that is being displayed by scrolling display. As a result, the user can more easily differentiate between the piece of new information 43 (N1 according to the present embodiment) that has been inserted into the scrolling display of the second rank information 42 and the pieces of second rank information 42 that are already being displayed by scrolling display, at a glance. As a result, the user can easily ascertain the newly inserted piece of new information 43 (N1) among the pieces of second rank information 42 that are being displayed with scrolling. Consequently, a safer information presentation can be achieved.

Third Embodiment

Next, a third embodiment will be described with reference to FIGS. 17 to 21.

Figure 19:
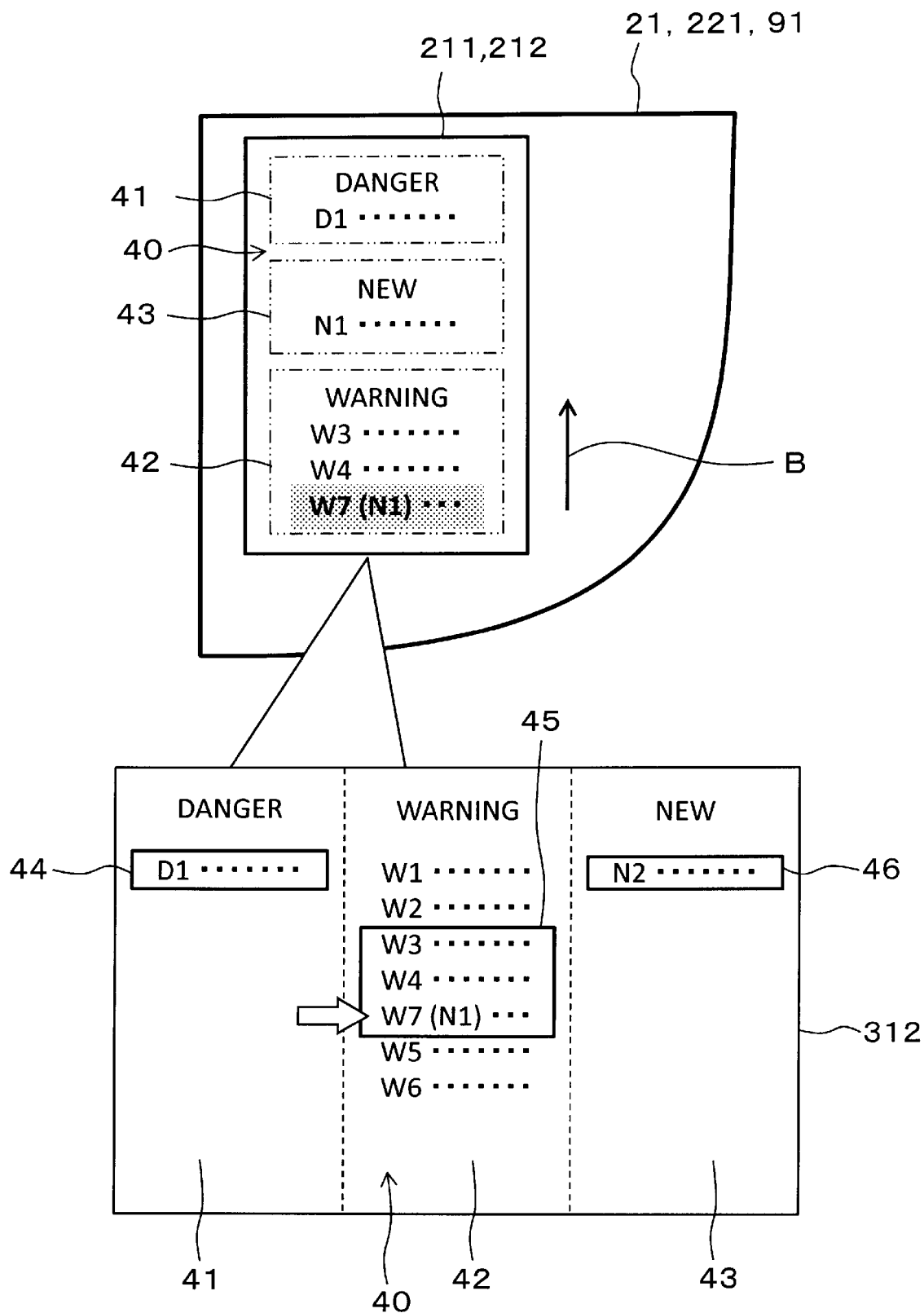
FIG. 19 is a diagram (3) of the example of a portion of the field of view visible to the user through the display unit and the monitoring target information stored in the storage area, according to the third embodiment.
Figure 20:
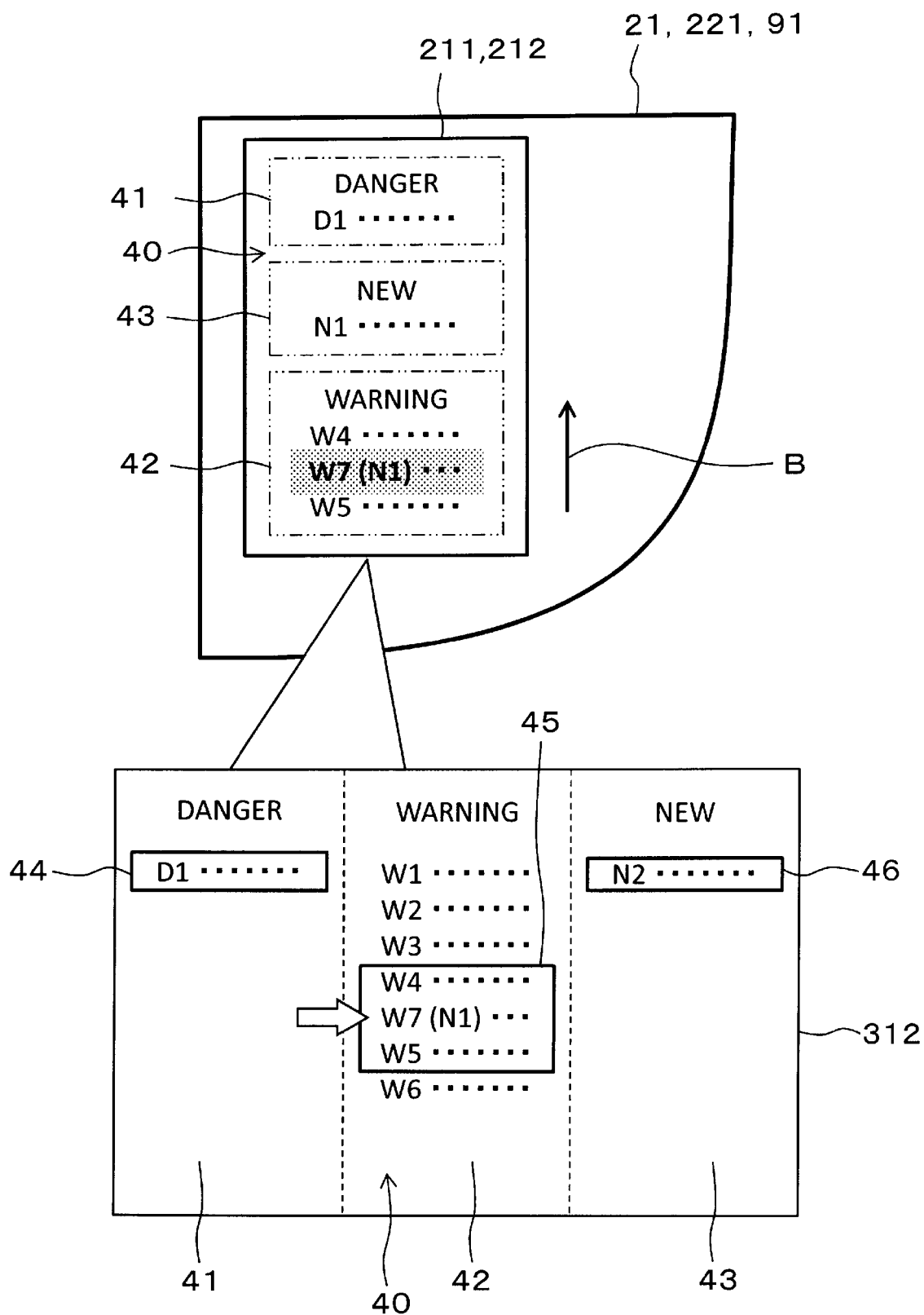
FIG. 20 is a diagram (4) of the example of a portion of the field of view visible to the user through the display unit and the monitoring target information stored in the storage area, according to the third embodiment.
Figure 21:
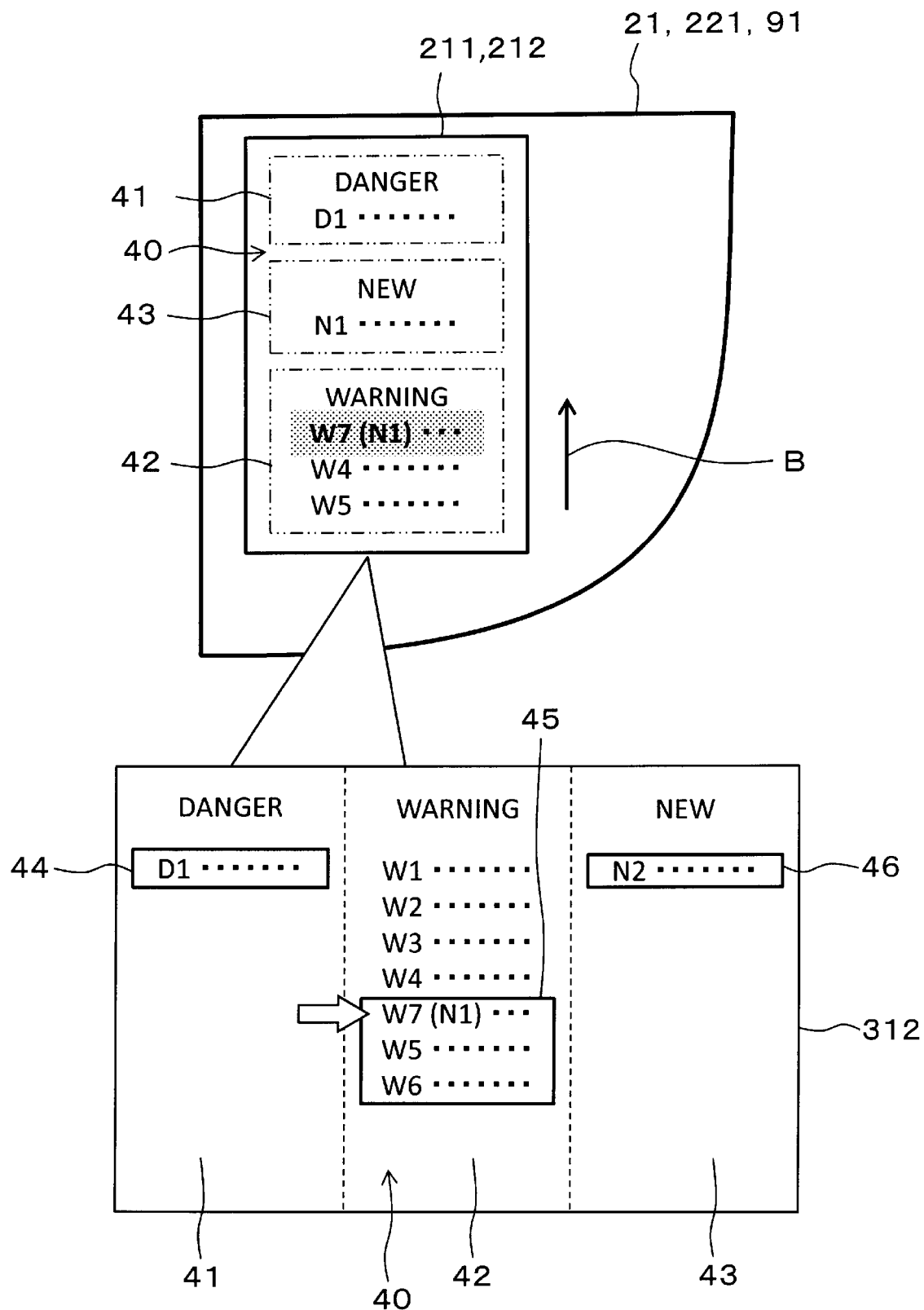
FIG. 21 is a diagram (5) of the example of a portion of the field of view visible to the user through the display unit and the monitoring target information stored in the storage area, according to the third embodiment.

According to the third embodiment, a scrolling direction of the second rank information 42 is the opposite of that according to the above-described second embodiment. That is, as shown in the drawings from FIG. 17 to FIG. 18, the display control unit 36 scrolls the second rank information 42 in a direction approaching the newest piece of new information 43 (N1 according to the present embodiment), that is, in this case, upwards as indicated by an arrow B. In addition, as shown in FIG. 19, when the monitoring target information acquiring unit 32 acquires the next piece of new information 43 (N2 according to the present embodiment), the display control unit 36 inserts the previous piece of new information 43 (N1 according to the present embodiment) at the end of the pieces of second rank information 42 that are currently being displayed within the display area 211, that is, in this case, after the piece of second rank information 42 (W4). Then, as shown in the drawings from FIG. 19 to FIG. 21, the display control unit 36 displays, with scrolling, the inserted previous piece of new information 43 (N1) together with the second rank information 42.

As a result, when the previous piece of new information 43 (N1) is displayed by being inserted into the second rank information 42 that is already being displayed with scrolling, display of the previous piece of new information 43 (N1) can be switched from display without scrolling to display with scrolling, with an appearance of discontinuity. Therefore, the user can more easily recognize that the newest piece of new information 43 that is displayed without scrolling has switched from the previous piece of new information (N1) to the current newest piece of new information 43 (N2). As a result, the user can even more easily be aware of the newest piece of new information 43 (N2). Consequently, a safer information presentation can be achieved.

The embodiments of the present disclosure are not limited to the aspects described above or in the drawings. Various modifications and expansions are possible without departing from the spirit of the present disclosure.

According to the above-described embodiments, the display control unit 36 is assumed to repeatedly perform the scrolling display of the second rank information 42. However, the display control unit 36 is not necessarily required to repeatedly perform the scrolling display. For example, the display control unit 36 may display all pieces of the second rank information 42 by displaying the second rank information 42 by scrolling display only once.

Figure 22:
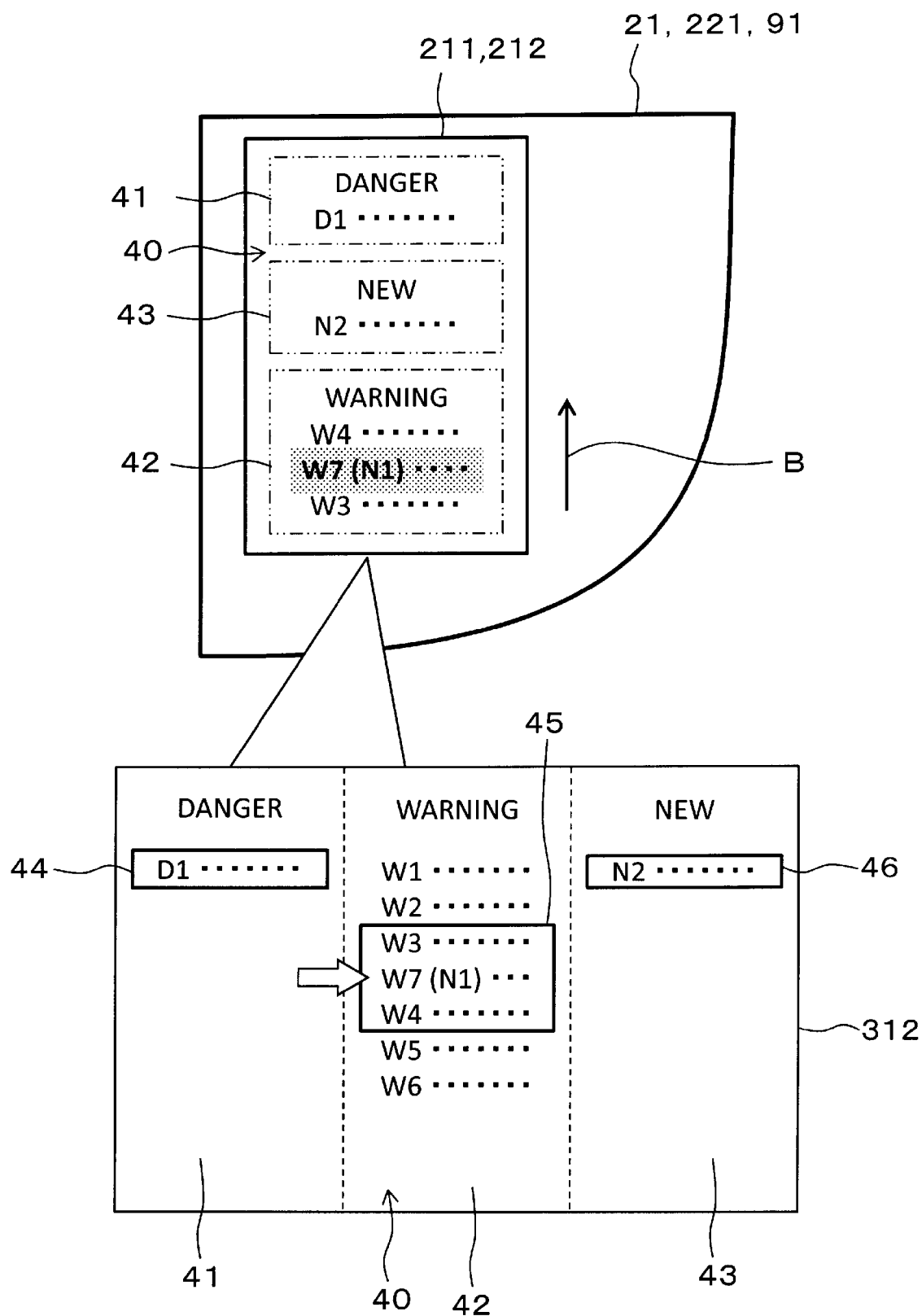
FIG. 22 is a diagram (1) of an example of a portion of a field of view visible to a user through a display unit and monitoring target information stored in a storage area, according to another embodiment.
Figure 23:
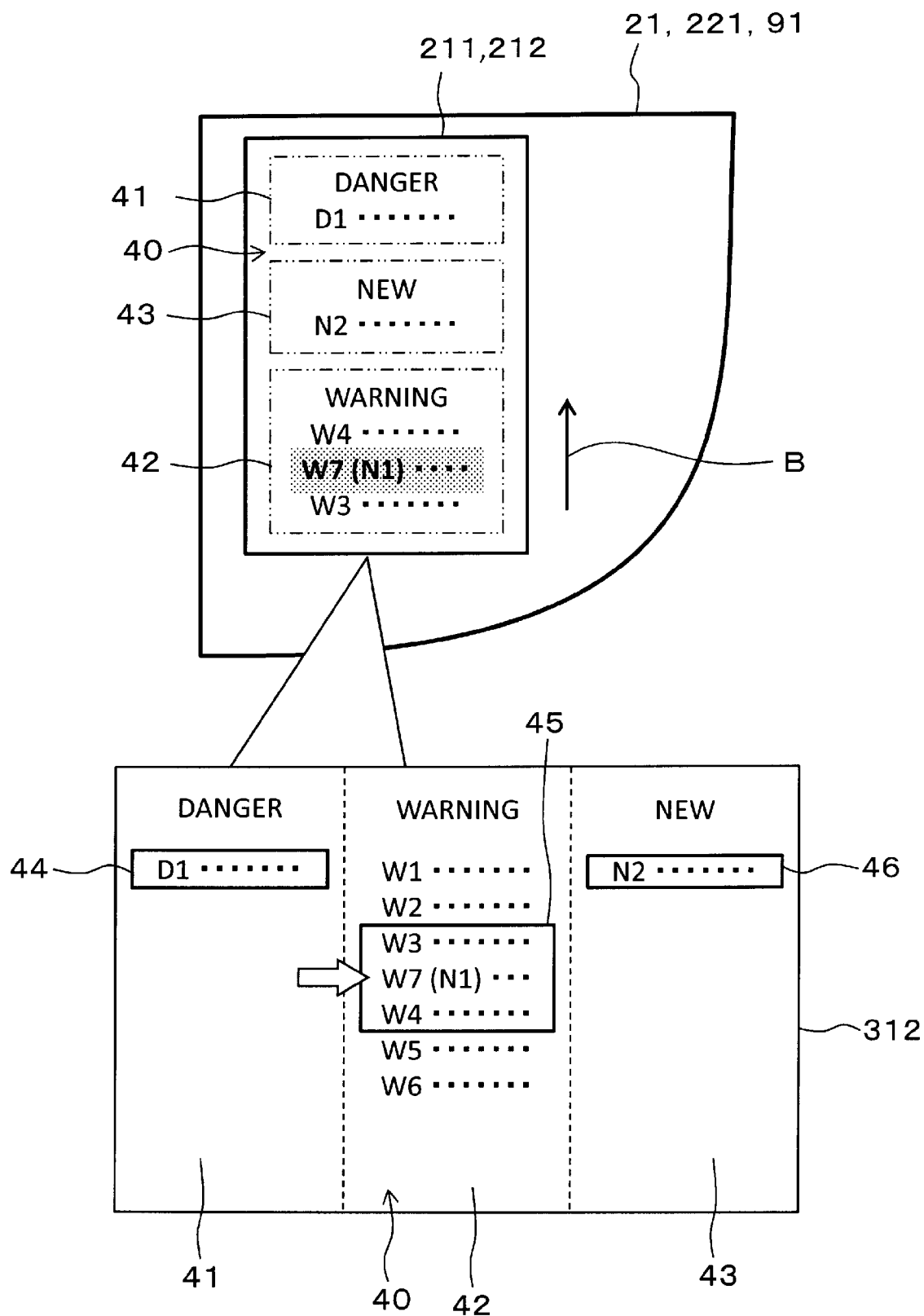
FIG. 23 is a diagram (2) of the example of a portion of the field of view visible to the user through the display unit and the monitoring target information stored in the storage area, according to the other embodiment.

In addition, according to the above-described second embodiment and third embodiment, as shown in FIG. 14 or FIG. 19, when the monitoring target information acquiring unit 32 acquires the next piece of new information 43 (N2 according to the above-described embodiments), the display control unit 36 inserts the previous piece of new information 43 (N1 according to the above-described embodiments) at the end of the pieces of second rank information 42 that are currently being displayed within the display area 211, that is, in this case, after the piece of second rank information 42 (W4). However, the insertion position of the previous piece of new information 43 (N1) is not limited thereto. For example, as shown in FIG. 22 and FIG. 23, the display control unit 36 may insert the previous piece of new information 43 (N1) in a center portion of the pieces of second rank information 42 that are currently being displayed within the display area 211, that is, in this case, between the piece of second rank information (W3) and the piece of second rank information (W4). As a result of this as well, working effects similar to those according to the above-described embodiments can be achieved.

Furthermore, according to the above-described first to third embodiments, the following example is given. That is, the monitoring target information 40 (the first rank information 41, the second rank information 42, and the new information 43) within the display area 211 and the maximum area 212 is displayed along a vertical direction (up/down direction; for example, the direction A away from the display position of the new information 43 according to the second embodiment corresponds to a downward direction and the direction B approaching the display position of the new information 43 according to the third embodiment corresponds to an upward direction) within the field of view 91 of the user (corresponding to the imaging area 221 of the camera 22 and the area of the display unit 21). The second rank information 42 is displayed by scrolling display in this vertical direction. However, the display aspect of the monitoring target information 40 is not limited thereto.

For example, as shown in FIGS. 24 and 25, a following configuration is also possible. That is, the monitoring target information 40 (the first rank information 41, the second rank information 42, and the new information 43) within the display area 211 and the maximum area 212 is displayed along a lateral direction (left/right direction; for example, the direction A away from the display position of the new information 43 corresponds to a rightward direction in FIG. 24 and the direction B approaching the display position of the new information 43 according to the third embodiment corresponds to a leftward direction in FIG. 25) within the field of view 91 of the user (corresponding to the imaging area 221 of the camera 22 and the area of the display unit 21). The second rank information 42 is displayed by scrolling display in this lateral direction.

In addition, for example, the control unit 31, the monitoring target information acquiring unit 32, the field-of-view acquiring unit 33, the monitoring target identifying unit 34, the display area setting unit 35, and the display control unit 36 may be provided so as to be separately dispersed on either of the safety apparatus 13 side or the HMD 20 side.

The robot 11 is not limited to that which is fixed at a specific location. For example, the robot 11 may be a mobile robot. Moreover, the monitoring target is not limited to a robot. For example, the monitoring target may be a manned carrier, such as a forklift, that is driven by a person, or a mobile object, such as an unmanned carrier, that automatically travels.

What is claimed is:

1. An information display system comprising:
a wearable display configured to be worn by a user and display information within a field of view of the user; and
a processor programmed to:
acquire monitoring target information that is information related to a monitoring target;
set a display area for displaying the monitoring target information within the field of view of the user;
instruct the wearable display to display the monitoring target information within the display area without scrolling when an amount of information of the monitoring target information fits within the display area;
instruct the wearable display to display the monitoring target within the display area with scrolling when the amount of information of the monitoring target information does not fit within the display area; and
instruct the wearable display to display an inside of the display area so as to be non-transparent in a first color that is based on a second color, the second color being a color of the monitoring target information.

2. The information display system according to claim 1, wherein:
the first color is different from the second color.

3. The information display system according to claim 1, wherein:
the first color is an opposite color to the second color.

4. An information display system comprising:
a wearable display configured to be worn by a user and display information within a field of view of the user; and
a processor programmed to:
acquire monitoring target information that is information related to a monitoring target;
set a display area for displaying the monitoring target information within the field of view of the user;
instruct the wearable display to display the monitoring target information within the display area without scrolling when an amount of information of the monitoring target information fits within the display area; and
instruct the wearable display to display the monitoring target within the display area with scrolling when the amount of information of the monitoring target information does not fit within the display area,
wherein the display area is set in correspondence to the amount of information of the monitoring target information such that the monitoring target is displayed without scrolling when the amount of information of the monitoring target information fits within a maximum area that is set in advance, and the display area is set to the maximum area when the amount of information of the monitoring target information does not fit within the maximum area.

5. The information display system according to claim 4, wherein:
the monitoring target information is classified into at least either of first rank information of which a degree of danger is high and second rank information of which the degree of danger is lower than that of the first rank information, based on a magnitude of danger; and
the processor is programmed to instruct the wearable display to display the first rank information at all times, and display the second rank information with scrolling when the amount of information of the second rank information does not fit within the display area.

6. The information display system according to claim 5, wherein:
the processor is programmed to repeatedly instruct the wearable display to display of the second rank information by scrolling at a fixed cycle, and make the cycle of scrolling faster as the amount of information of the second rank information increases.

7. The information display system according to claim 6, wherein:
the processor is programmed to instruct the wearable display to display at least a newest piece of monitoring target information, among newly acquired monitoring target information, without scrolling for a predetermined period.

8. The information display system according to claim 7, wherein:
the processor is programmed to instruct the wearable display to display a next piece of monitoring target information without scrolling as the newest piece of monitoring target information when the next piece of monitoring target information is acquired while a previous piece of acquired monitoring target information is being displayed without scrolling, and display the previous piece of monitoring target information by inserting the previous piece of monitoring target information into other pieces of monitoring target information that are already being displayed with scrolling.

9. The information display system according to claim 8, wherein:
the processor is programmed to instruct the wearable display to display the previous piece of monitoring target information in a manner differing from a display aspect of the other pieces of monitoring target information when the previous piece of monitoring target information is displayed by being inserted into the other pieces of monitoring target information that are already being displayed with scrolling.

10. The information display system according to claim 9, wherein:
the processor is programmed to instruct the wearable display to display the other pieces of monitoring target information with scrolling in a direction away from a display position of the newest piece of monitoring target information, and display the previous piece of monitoring target information, together with the other pieces of monitoring target information, with scrolling by inserting the previous piece of monitoring target information at an end of the other pieces of monitoring target information that are being displayed within the display area.

11. The information display system according to claim 9, wherein:
the processor is programmed to instruct the wearable display to display the other pieces of monitoring target information with scrolling in a direction approaching a display position of the newest piece of monitoring target information, and display the previous piece of monitoring target information, together with the other pieces of monitoring target information, with scrolling by inserting the previous piece of monitoring target information at an end of the other pieces of monitoring target information that are being displayed within the display area.

12. The information display system according to claim 8, wherein:
the processor is programmed to instruct the wearable display to display the other pieces of monitoring target information with scrolling in a direction away from a display position of the newest piece of monitoring target information, and display the previous piece of monitoring target information, together with the other pieces of monitoring target information, with scrolling by inserting the previous piece of monitoring target information at the end of the other pieces of monitoring target information that are being displayed within the display area.

13. The information display system according to claim 8, wherein:
the processor is programmed to instruct the wearable display to display the other pieces of monitoring target information with scrolling in a direction approaching a display position of the newest piece of monitoring target information, and display the previous piece of monitoring target information, together with the other pieces of monitoring target information, with scrolling by inserting the previous piece of monitoring target information at an end of the other pieces of monitoring target information that are being displayed within the display area.

14. The information display system according to claim 4, wherein:
the processor is programmed to instruct the wearable display to display the inside of the display area such that an actual scene in a background of the display area is covered and hidden.

15. The information display system according to claim 4, wherein:
the processor is programmed to instruct the wearable display to display the inside of the display area so as to be non-transparent.

16. An information display system comprising:
a wearable display configured to be worn by a user and display information within a field of view of the user; and
a processor programmed to:
acquire monitoring target information that is information related to a monitoring target, the monitoring target information being classified into at least either of first rank information of which a degree of danger is high and second rank information of which the degree of danger is lower than that of the first rank information, based on a magnitude of danger;
set a display area for displaying the monitoring target information within the field of view of the user;
instruct the wearable display to display the monitoring target information within the display area without scrolling when an amount of information of the monitoring target information fits within the display area;
instruct the wearable display to display the monitoring target within the display area with scrolling when the amount of information of the monitoring target information does not fit within the display area; and
instruct the wearable display to display the first rank information at all times, and display the second rank information with scrolling when the amount of information of the second rank information does not fit within the display area.

17. An information display system comprising:
a wearable display configured to be worn by a user and display information within a field of view of the user; and
a processor programmed to:
acquire monitoring target information that is information related to a monitoring target;
set a display area for displaying the monitoring target information within the field of view of the user;
instruct the wearable display to display the monitoring target information within the display area without scrolling when an amount of information of the monitoring target information fits within the display area;
instruct the wearable display to display the monitoring target within the display area with scrolling when the amount of information of the monitoring target information does not fit within the display area; and
instruct the wearable display to display at least a newest piece of monitoring target information, among newly acquired monitoring target information, without scrolling for a predetermined period.

* * * * *